US008326261B2

(12) United States Patent  
Smith

(10) Patent No.: US 8,326,261 B2
(45) Date of Patent: Dec. 4, 2012

(54) SUPPLIER FUNDS RECEPTION ELECTRONICALLY

(75) Inventor: Glyn Barry Smith, Chesterfield (GB)

(73) Assignee: Boku, Inc., San Francisco, CA (US)

( * ) Notice: Subject to any disclaimer, the term of this patent is extended or adjusted under 35 U.S.C. 154(b) by 740 days.

(21) Appl. No.: 12/413,480

(22) Filed: Mar. 27, 2009
(Under 37 CFR 1.47)

(65) Prior Publication Data

US 2010/0015944 A1 Jan. 21, 2010

(51) Int. Cl.
*H04M 11/00* (2006.01)
(52) U.S. Cl. ...... 455/406; 455/466; 455/411; 455/412.2; 455/419; 455/502; 455/566
(58) Field of Classification Search .................. 455/466, 455/406, 411, 412.2, 419, 502, 566
See application file for complete search history.

(56) References Cited

U.S. PATENT DOCUMENTS

| | | |
|---|---|---|
| 5,708,422 A | 1/1998 | Blonder et al. |
| 5,845,260 A | 12/1998 | Nakano et al. |
| 5,905,873 A | 5/1999 | Hartmann et al. |
| 5,914,472 A | 6/1999 | Foladare et al. |
| 5,953,710 A | 9/1999 | Fleming |
| 6,227,447 B1 | 5/2001 | Campisano |
| 6,302,326 B1 | 10/2001 | Symonds et al. |
| 6,473,808 B1 | 10/2002 | Yeivin et al. |
| 6,612,488 B2 | 9/2003 | Suzuki |
| 6,718,178 B1 | 4/2004 | Sladek et al. |
| 6,788,771 B2 | 9/2004 | Manto |
| 6,807,410 B1 | 10/2004 | Pailles et al. |
| 6,928,558 B1 | 8/2005 | Allahwerdi et al. |
| 6,965,872 B1 | 11/2005 | Grdina |
| 6,996,409 B2 | 2/2006 | Gopinath et al. |
| 7,013,125 B2 | 3/2006 | Henrikson |
| 7,107,068 B2 | 9/2006 | Benzon et al. |
| 7,174,301 B2 | 2/2007 | Florance et al. |
| 7,221,951 B2 | 5/2007 | Anvekar et al. |
| 7,292,996 B2 | 11/2007 | Nobrega et al. |
| 7,308,254 B1 | 12/2007 | Rissanen |

(Continued)

FOREIGN PATENT DOCUMENTS

GB 2379525 3/2003

(Continued)

OTHER PUBLICATIONS

Amazon.com, Inc., "Get Gold Box Deals Every Day with Amazon Text Alerts," located at http://www.amazon.com/gp/anywhere/sms/goldbox, available at least by Jun. 10, 2009.

(Continued)

*Primary Examiner* — Kwasi Karikari
(74) *Attorney, Agent, or Firm* — Stephen M. De Klerk

(57) ABSTRACT

Apparatuses and methods to facilitate customer to supplier funds transfer via premium messages. In one aspect, an apparatus to electronically transfer funds from a customer to a supplier, includes: a server component connected to a network; and a database coupled to the server component. The server component is configured to: transmit a plurality of premium rate mobile terminating text messages to the first mobile cellular telephone to effect a transfer of funds from the customer for reception by the supplier, after the customer has placed an order with the supplier; and transmit a notification message to a second mobile cellular telephone having a second telephone number to confirm that the transfer of funds has taken place.

20 Claims, 32 Drawing Sheets

U.S. PATENT DOCUMENTS

| | | |
|---|---|---|
| 7,315,541 B1 | 1/2008 | Housel et al. |
| 7,331,518 B2 | 2/2008 | Rable |
| 7,357,310 B2 | 4/2008 | Calabrese et al. |
| 7,366,702 B2 | 4/2008 | David |
| 7,374,079 B2 | 5/2008 | Nam et al. |
| 7,437,331 B1 | 10/2008 | Rosenberger |
| 7,458,507 B2 | 12/2008 | Fillinger et al. |
| 7,478,055 B2 | 1/2009 | Goino |
| 7,487,114 B2 | 2/2009 | Florance et al. |
| 7,748,614 B2 | 7/2010 | Brown |
| 7,752,135 B2 | 7/2010 | Brown et al. |
| 7,870,077 B2 | 1/2011 | Woo et al. |
| 7,890,433 B2 | 2/2011 | Singhal |
| 2001/0003093 A1 | 6/2001 | Lundin |
| 2001/0037264 A1 | 11/2001 | Husemann et al. |
| 2002/0013727 A1 | 1/2002 | Lee |
| 2002/0016769 A1 | 2/2002 | Barbara et al. |
| 2002/0035539 A1 | 3/2002 | O'Connell |
| 2002/0059146 A1 | 5/2002 | Keech |
| 2002/0087471 A1 | 7/2002 | Ganesan et al. |
| 2002/0120582 A1 | 8/2002 | Elston et al. |
| 2002/0193094 A1 | 12/2002 | Lawless et al. |
| 2003/0061111 A1* | 3/2003 | Dutta et al. .................. 705/26 |
| 2003/0065525 A1 | 4/2003 | Giacchetti et al. |
| 2003/0119478 A1 | 6/2003 | Nagy et al. |
| 2003/0125969 A1 | 7/2003 | Kizer et al. |
| 2003/0126076 A1 | 7/2003 | Kwok |
| 2004/0019564 A1 | 1/2004 | Goldhwaite et al. |
| 2004/0044582 A1 | 3/2004 | Chowdhary |
| 2004/0122685 A1 | 6/2004 | Bunce |
| 2004/0248596 A1 | 12/2004 | Panchal |
| 2005/0055296 A1 | 3/2005 | Hattersley et al. |
| 2005/0055309 A1 | 3/2005 | Williams et al. |
| 2005/0177442 A1 | 8/2005 | Sullivan et al. |
| 2005/0177517 A1 | 8/2005 | Leung et al. |
| 2005/0199709 A1 | 9/2005 | Linlor |
| 2005/0245257 A1 | 11/2005 | Woodhill |
| 2006/0131390 A1 | 6/2006 | Kim |
| 2006/0206709 A1 | 9/2006 | Labrou et al. |
| 2006/0235789 A1* | 10/2006 | Koch .................. 705/39 |
| 2006/0253335 A1 | 11/2006 | Keena et al. |
| 2006/0258331 A1 | 11/2006 | Syrett et al. |
| 2006/0259438 A1 | 11/2006 | Randle et al. |
| 2006/0276171 A1 | 12/2006 | Pousti |
| 2007/0005467 A1 | 1/2007 | Haigh et al. |
| 2007/0022019 A1 | 1/2007 | Sherwin et al. |
| 2007/0027775 A1 | 2/2007 | Hwang |
| 2007/0027803 A1 | 2/2007 | Brandes et al. |
| 2007/0043664 A1 | 2/2007 | Wilkes |
| 2007/0055440 A1 | 3/2007 | Denker et al. |
| 2007/0061244 A1 | 3/2007 | Ramer et al. |
| 2007/0078760 A1* | 4/2007 | Conaty et al. .................. 705/39 |
| 2007/0094080 A1 | 4/2007 | Wiken |
| 2007/0118477 A1 | 5/2007 | Graves et al. |
| 2007/0123219 A1 | 5/2007 | Lovell, Jr. |
| 2007/0123229 A1 | 5/2007 | Pousti |
| 2007/0130025 A1 | 6/2007 | Nakajima |
| 2007/0130044 A1 | 6/2007 | Rowan |
| 2007/0175978 A1 | 8/2007 | Stambaugh |
| 2007/0198510 A1 | 8/2007 | Ebanks |
| 2007/0203836 A1 | 8/2007 | Dodin |
| 2007/0208632 A1 | 9/2007 | Downes et al. |
| 2007/0233597 A1 | 10/2007 | Petersen et al. |
| 2007/0244731 A1 | 10/2007 | Barhydt et al. |
| 2007/0244811 A1 | 10/2007 | Tumminaro et al. |
| 2007/0255653 A1 | 11/2007 | Tumminaro et al. |
| 2007/0255662 A1 | 11/2007 | Tumminaro et al. |
| 2007/0260556 A1 | 11/2007 | Pousti |
| 2007/0266034 A1 | 11/2007 | Pousti |
| 2007/0266130 A1 | 11/2007 | Mazur et al. |
| 2007/0270125 A1 | 11/2007 | Pousti |
| 2008/0009263 A1 | 1/2008 | Pousti |
| 2008/0010192 A1 | 1/2008 | Rackley, III et al. |
| 2008/0040139 A1 | 2/2008 | Pousti |
| 2008/0040265 A1 | 2/2008 | Rackley, III et al. |
| 2008/0040733 A1 | 2/2008 | Pousti |
| 2008/0052091 A1 | 2/2008 | Vawter |
| 2008/0052363 A1 | 2/2008 | Pousti |
| 2008/0057904 A1 | 3/2008 | Pousti |
| 2008/0082509 A1 | 4/2008 | Bessieres et al. |
| 2008/0091614 A1 | 4/2008 | Bas Bayod et al. |
| 2008/0103984 A1 | 5/2008 | Choe et al. |
| 2008/0109279 A1 | 5/2008 | Csoka |
| 2008/0109528 A1 | 5/2008 | Knight et al. |
| 2008/0120698 A1 | 5/2008 | Ramia |
| 2008/0126145 A1 | 5/2008 | Rackley, III et al. |
| 2008/0133403 A1 | 6/2008 | Hamzeh |
| 2008/0133735 A1 | 6/2008 | Thayer et al. |
| 2008/0140569 A1 | 6/2008 | Handel |
| 2008/0154772 A1 | 6/2008 | Carlson |
| 2008/0167017 A1 | 7/2008 | Wentker et al. |
| 2008/0177628 A1 | 7/2008 | Payette |
| 2008/0189186 A1 | 8/2008 | Choi et al. |
| 2008/0201201 A1 | 8/2008 | Pousti |
| 2008/0228595 A1 | 9/2008 | Hill et al. |
| 2008/0233918 A1 | 9/2008 | Pousti |
| 2008/0249938 A1* | 10/2008 | Drake-Stoker .................. 705/44 |
| 2008/0275779 A1 | 11/2008 | Lakshminarayanan |
| 2008/0287095 A1 | 11/2008 | Pousti |
| 2008/0288299 A1 | 11/2008 | Schultz |
| 2009/0006184 A1 | 1/2009 | Leach et al. |
| 2009/0006217 A1 | 1/2009 | Smith |
| 2009/0024614 A1 | 1/2009 | Pousti |
| 2009/0029687 A1 | 1/2009 | Ramer et al. |
| 2009/0063178 A1 | 3/2009 | Pousti et al. |
| 2009/0063312 A1 | 3/2009 | Hurst |
| 2009/0070583 A1 | 3/2009 | Von Mueller et al. |
| 2009/0081989 A1 | 3/2009 | Wuhrer |
| 2009/0112765 A1 | 4/2009 | Skowronek |
| 2009/0119190 A1 | 5/2009 | Realinij |
| 2009/0124238 A1 | 5/2009 | Wilson |
| 2009/0156170 A1 | 6/2009 | Rossano et al. |
| 2009/0171805 A1* | 7/2009 | Gould et al. .................. 705/26 |
| 2009/0172402 A1 | 7/2009 | Tran |
| 2009/0182634 A1 | 7/2009 | Park et al. |
| 2009/0192928 A1 | 7/2009 | Abifaker |
| 2009/0204546 A1 | 8/2009 | Haidar |
| 2009/0220060 A1 | 9/2009 | Wilson |
| 2009/0265273 A1 | 10/2009 | Guntupalli et al. |
| 2010/0010911 A1 | 1/2010 | Smith |
| 2010/0015957 A1 | 1/2010 | Smith |
| 2010/0017285 A1 | 1/2010 | Smith |
| 2010/0094732 A1 | 4/2010 | Smith |
| 2010/0125514 A1 | 5/2010 | Blackhurst et al. |
| 2010/0153249 A1 | 6/2010 | Yuan et al. |
| 2010/0179907 A1 | 7/2010 | Atkinson |
| 2010/0190471 A1 | 7/2010 | Smith |
| 2010/0191646 A1 | 7/2010 | Smith |
| 2010/0191648 A1 | 7/2010 | Smith |
| 2010/0216425 A1 | 8/2010 | Smith |
| 2010/0217696 A1 | 8/2010 | Schuba et al. |
| 2010/0223183 A1 | 9/2010 | Smith |
| 2010/0235276 A1 | 9/2010 | Smith |
| 2010/0250687 A1 | 9/2010 | Smith |
| 2010/0267362 A1 | 10/2010 | Smith et al. |
| 2010/0299220 A1 | 11/2010 | Baskerville |
| 2010/0299731 A1 | 11/2010 | Atkinson |
| 2010/0306015 A1 | 12/2010 | Kingston |
| 2010/0306099 A1 | 12/2010 | Hirson |
| 2010/0312645 A1 | 12/2010 | Niejadlik |
| 2010/0312678 A1 | 12/2010 | Davis |
| 2011/0010292 A1 | 1/2011 | Giordano et al. |
| 2011/0022484 A1 | 1/2011 | Smith et al. |
| 2011/0035264 A1 | 2/2011 | Zaloom |
| 2011/0035302 A1 | 2/2011 | Martell et al. |
| 2011/0071922 A1 | 3/2011 | Hirson et al. |
| 2011/0072039 A1 | 3/2011 | Tayloe |
| 2011/0078077 A1 | 3/2011 | Hirson |
| 2011/0082772 A1 | 4/2011 | Hirson |
| 2011/0125610 A1 | 5/2011 | Goodsall et al. |
| 2011/0143710 A1 | 6/2011 | Hirson |
| 2011/0143711 A1 | 6/2011 | Hirson |

FOREIGN PATENT DOCUMENTS

| | | |
|---|---|---|
| JP | 2007109014 | 4/2007 |
| JP | 2007179383 | 7/2007 |
| KR | 20000036574 | 7/2000 |

| | | |
|---|---|---|
| KR | 20030030684 | 4/2003 |
| KR | 20060103797 | 10/2006 |
| KR | 20070051817 | 5/2007 |
| KR | 20070103650 | 10/2007 |
| KR | 20080011338 | 2/2008 |
| WO | 9738538 | 10/1997 |
| WO | WO-2007004792 | 1/2007 |
| WO | WO-2007084593 | 7/2007 |
| WO | 2007102648 | 9/2007 |
| WO | 2007127521 | 11/2007 |
| WO | 2009044396 | 4/2009 |

OTHER PUBLICATIONS

Aradiom Inc., "The Real Solution—Aradiom SolidPass", located at http://www.aradiom.com/SolidPass/2fa-OTP-security-token.htm, available at least by Apr. 24, 2009.
Chua, Lye Heng, "How Customers Applied Java CAPS?" Sun Microsystems, Inc. presentation, Nov. 6, 2007.
Hassinen, Marko et al., "An Open, PKI-Based Mobile Payment System," Emerging Trends in Information and Communication Security, Lecture Notes in Computer Science, vol. 3995/2006, pp. 86-89, Jun. 1, 2006.
International Application No. PCT/US10/24525, International Search Report and Written Opinion, May 17, 2010.
International Application No. PCT/US10/57472, International Search Report and Written Opinion, Jan. 18, 2011.
International Application No. PCT/US10/59295, International Search Report and Written Opinion, Feb. 1, 2011.
International Application No. PCT/US10/59466, International Search Report and Written Opinion, Feb. 1, 2011.
International Application No. PCT/US11/22419, International Search Report and Written Opinion, Mar. 29, 2011.
International Application No. PCT/US11/22426, International Search Report and Written Opinion, Mar. 28, 2011.
International Application No. PCT/US2009/033823, International Search Report and Written Opinion, Sep. 24, 2009.
International Application No. PCT/US2009/039723, International Search Report and Written Opinion, Oct. 30, 2009.
International Application No. PCT/US2010/020189, International Search Report and Written Opinion, Dec. 10, 2010.
International Application No. PCT/US2010/021054, International Search Report and Written Opinion, Jul. 29, 2010.
International Application No. PCT/US2010/024535, International Search Report and Written Opinion, May 25, 2010.
International Application No. PCT/US2010/030338, International Search Report & Written Opinion, Jun. 3, 2010.
International Application No. PCT/US2010/032668, International Search Report and Written Opinion, Jul. 1, 2010.
International Application No. PCT/US2010/036940, International Search Report and Written Opinion, Jul. 21, 2010.
International Application No. PCT/US2010/037816, International Search Report and Written Opinion, Aug. 5, 2010.
International Application No. PCT/US2010/042703, International Search Report and Written Opinion, Sep. 13, 2010.
International Application No. PCT/US2010/046266, International Search Report and Written Opinion, Oct. 20, 2010.
Mobilians Co. Ltd., company website located at http://www.mobilians.co.kr/english/, available at least by Jan. 12, 2009.
PayPal, Inc., "Get What You Want, When You Want It," located at https://www.paypal.com/cgi-bin/webscr?cmd=xpt/Marketing/mobile/MobileBuyStuff-outside, available at least by Mar. 5, 2009.
PayPal, Inc., "Texting with PayPal—Easy as Lifting a Finger," located at https://www.paypal.com/cgi-bin/webscr?cmd=xpt/Marketing/mobile/MobileAdvancedFeatures-outside, available at least by Mar. 5, 2009.
Squidoo, LLC, "Introducing MobillCash: Make a Secure Sale Even When an Online Customer Has No Cash, Credit Cards or I.D.," located at http://www.squidoo.com/mobillcash-pay-by-mobile-phone, available at least by Aug. 29, 2008.
Sun Microsystems Inc., "The Road to Mobile Banking," white paper, Jun. 2008.
Tindal, Suzanne, "St. George Counts Down to Two-Factor Authentication," ZDNet Australia, Feb. 19, 2008.
Trusted Mobile Payment Framework, "Scheme Rules," version 2.0, Aug. 6, 2008.
VISUALtron Software Corporation, "2-Factor Authentication—What is MobileKey?" located at http://www.visualtron.com/products_mobilekey.htm, available at least by 2008.
Wikimedia Foundation, Inc., "Authentication," located at en.wikipedia.org/wiki/Authentication, Mar. 17, 2009.
Wikimedia Foundation, Inc., "Credit Card," located at en/wikipedia.org/wiki/Credit_card, Dec. 5, 2008.
Wikimedia Foundation, Inc., "Security Token," located at en.wikipedia.org/wiki/Security_token, Apr. 13, 2009.
Wikimedia Foundation, Inc., "Two-Factor Authentication," located at en.wikipedia.org/wiki/Two-factor_authentication, Apr. 24, 2009.
Zabawskyj, Bohdan, "In the Media: The Mobile Money Opportunity," Billing World and OSS Today, located at http://www.redknee.com/news_events/in_the_media/43/?PHPSESSID=1e0ca1ab057bf9dc2c88104877ca8010, Sep. 2007.
European Patent Application No. 09711520.8, Extended Search Report mailed Apr. 27, 2011.
International Application No. PCT/US2010/050616, International Search Report and Written Opinion, Apr. 26, 2011.
International Application No. PCT/US2011/30039, International Search Report and Written Opinion, May 23. 2011.
international Application No. PCT/US2011/30038, International Search Report and Written Opinion, May 25, 2011.
Onebip S.R.L , "OneBip—to Pay Online with Your Mobile Phone", Youtube online video at http://www.youtube.com/watch?v=RiEsMcc0tJY, May 23, 2007.
Arrington, Michael , "Mobile Payments Getting Traction on Social Networks but Fees are Sky High", Tech Crunch, located a http://techcrunch.com/2009/01/13mobile-payments-getting-traction-on-social-networks-but-fees-are-sky-high/,, Jan. 13, 2009.
Brooks, Rod , "MobilCash:Worlds First in Mobile Payments": YouTube online video located at http://youtube.com/wacth?v=j6xv35qSmbg,, Oct. 12, 2007.
Bruene, Jim , "PayPal Launches on Facebook: Who Wants to be the First Bank?", located at http://www.netbanker.com/2007/06paypal_launches_on_facebook_who_wants_to_be_the_first_bank_on_facebook.hml,, Jun. 22, 2007.
Chen, Will , "Gift Shop Credits Have Arrived", The Facebook Blog, located at gttp://blog.facebook.com/blog.php?post=36577782130, Oct. 31, 2008.
Federal Trade Commission, , "Children's Online Privacy Protection Act (COPPA)", 15 U.S.C. §§ 6501-6506, Oct. 21, 1998.
Ihlwan, Moon , "In Korea, Cell Phones Get a New Change", http://businessweek.com/globalbiz/content/mar2006/gb20060301_260288.htm, Mar. 1, 2006.
Lee, Jessica, "Payment Industry Perspectives: Q&A with Zong CEO David Marcus", http://www.insidefacebook.com/2009/05/19payment-industry-perspectives-qa-with-zong-ceo-david-marcus/, May 19, 2009.
Nicole, Kirsten , "Pay me Lets You Send and Receive Money Through Facebook", http://mashable.com/2007/06/17pay-me-facebook-app, Jun. 17, 2007.
Zong, Inc., , "Virtual Goods/Currency and Mobile Payments: The Business Model for Social Apps", The Zong Blog at http://blog-zong.com/2008/10/25/virtual-goods-currency-and-mobile-payments-the business-model-for-social-apps/, Oct. 28, 2008.
Zong, Inc., , "Zong Mobile Payment Demo on A Facebook App", You Tube online video at http://www.youtube.com/watch?v=aLjRcAFrGil, Jan. 5, 2009.
Zong, Inc., , "Zong—Mobile Payments for Your Web App", You tube online video at http://www.youtube.com/watch?v=O2C3SQraAvQ, Sep. 5, 2008.

* cited by examiner

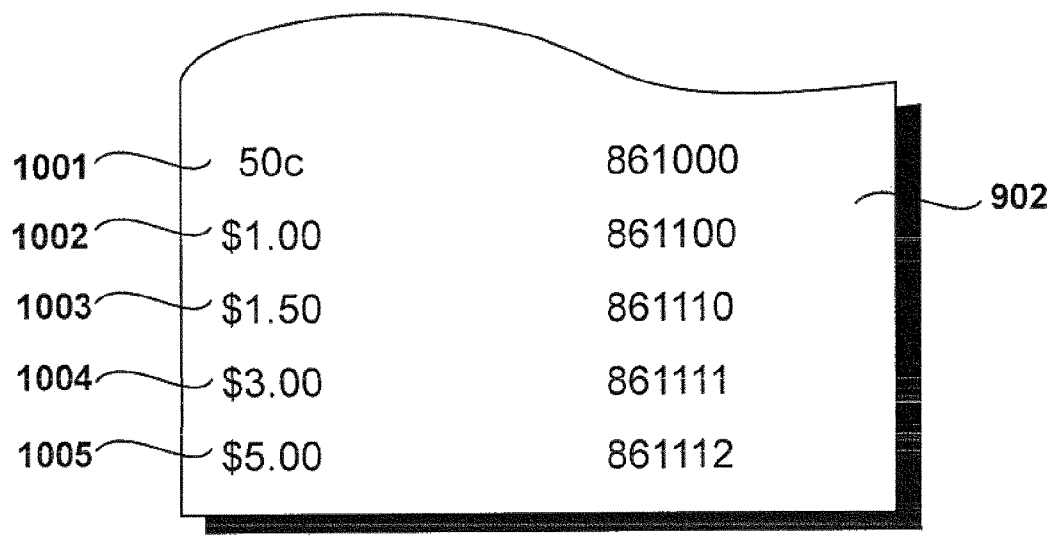
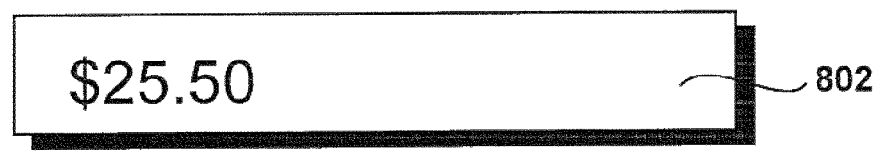
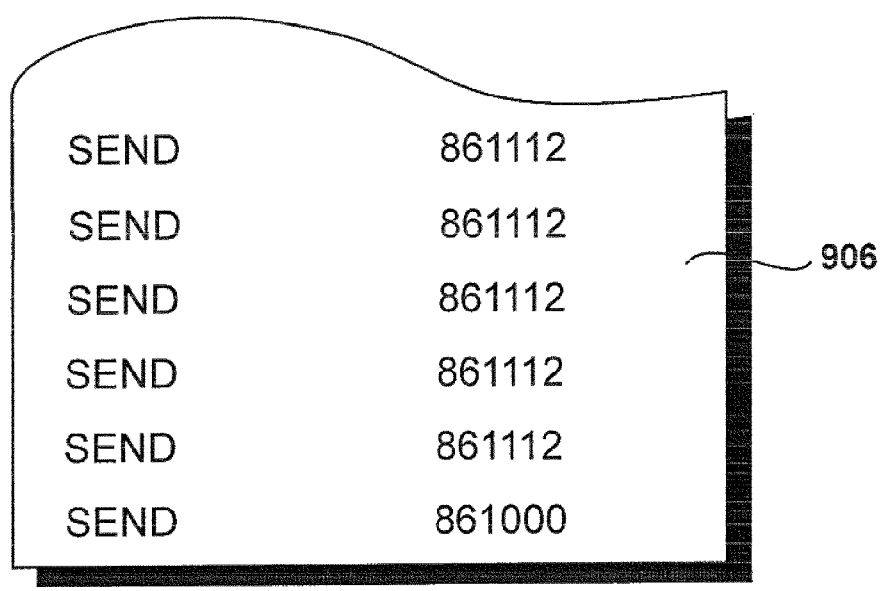
Fig. 10

| 1501 | 1502 | 1503 | 1504 | 1505 | 1506 | 1507 | 1508 |
|---|---|---|---|---|---|---|---|
| ID | PHONE | GN | FN | GENDER | CITY | ENTERTAINMENT | HOBBY |
| 001 | [P1] | [GN1] | [FN1] | M | [C1] | [E1] | [H1] |
| 002 | [P2] | [GN2] | [FN2] | F | [C2] | [E2] | [H2] |
| 003 | [P3] | [GN3] | [FN3] | F | [C3] | [E3] | [H3] |
| 004 | [P4] | [GN4] | [FN4] | M | [C4] | [E4] | [H4] |
| 005 | [P5] | [GN5] | [FN5] | M | [C5] | [E5] | [H5] |
| 006 | [P6] | [GN6] | [FN6] | M | [C6] | [E6] | [H6] |
| 007 | [P7] | [GN7] | [FN7] | F | [C7] | [E7] | [H7] |
| 008 | [P8] | [GN8] | [FN8] | F | [C8] | [E8] | [H8] |
| 009 | [P9] | [GN9] | [FN9] | M | [C9] | [E9] | [H9] |
| 010 | [P10] | [GN10] | [FN10] | M | [C10] | [E10] | [H10] |

*Fig. 15*

| 1702 | 1703 | 1704 | 1705 | 1706 | 1707 |
|---|---|---|---|---|---|
| ID | SUPPLIER | PRODUCT | NET PRICE | DISCOUNT | ACTUAL PAID |
| 0101 | JONES | [P1] | [NP1] | [D1] | [AP1] |
| 4781 | SMITH | [P2] | [NP2] | [D2] | [AP2] |
| 3211 | BROWN | [P3] | [NP3] | [D3] | [AP3] |
| 4781 | JONES | [P4] | [NP4] | [D4] | [AP4] |
| 4781 | BIG INC | [P5] | [NP5] | [D5] | [AP5] |
| 1049 | BIGGER INC | [P6] | [NP6] | [D6] | [AP6] |
| 0976 | SMITH | [P7] | [NP7] | [D7] | [AP7] |

| CLASS | DESCRIPTION |
|---|---|
| 12 | OVER 11 |
| 14 | OVER 13 |
| 16 | OVER 15 |
| 18 | ADULT |
| 0 | NOT RESTRICTED |
| 5 | SPECIALIST |

2201 — CLASS
2202 — DESCRIPTION

Fig. 22

|   PID  |  CLASS  |
|:------:|:-------:|
|  0001  |    0    |
|  0002  |    0    |
|  0003  |   12    |
|  0004  |   18    |
|  0005  |    0    |
|  0006  |   18    |
|        |         |

2402 — PID
2403 — CLASS

Fig. 24          2401

| BLOCKED CLASS | USER ID |
|---|---|
| 18 | 002 |
| 18 | 006 |
| 18 | 021 |
| 18 | 131 |
| 18 | 164 |
|  |  |

Fig. 26

SUPPLIER FUNDS RECEPTION ELECTRONICALLY

RELATED APPLICATIONS

The present application claims priority to United Kingdom Patent Application Number 08 09 381.7, filed on May 23, 2008 and entitled "Supplier Funds Reception Electronically," the disclosure of which is incorporated herein by reference.

FIELD OF THE TECHNOLOGY

At least some embodiments of the disclosure relate to apparatuses to facilitate the reception of funds at a supplier electronically.

BACKGROUND

Systems for ordering products and/or services over the Internet and then making payment via the Internet are known. Many of these conventional systems involve identifying credit or debit card numbers such that funds may be obtained from a bank in a manner substantially similar to conventional credit card transactions.

A system for instructing payment to be made via mobile telephone text messages is described in United States patent application publication No. 2007/0203836 A1, published Aug. 30, 2007. This provides an alternative method of payment that may be considered more secure than entering credit card details into a networked computer system, but it has a disadvantage in that it requires a set up procedure in order for the method to be deployed.

An alternative approach is described in United States patent application publication number 2009/0006217 A1, published Jan. 1, 2009, which was filed Jun. 29, 2007 and assigned U.S. patent application Ser. No. 11/824,607. This process has been successfully deployed and is trading under the service mark "MOBILLCASH." The MOBILLCASH system allows an order to be placed over the Internet and for funds to be transferred by transmitting a plurality of premium rate mobile terminating text messages to a mobile telephone held by the customer. Thus, by this method, a customer is only required to enter their telephone number, resulting in a charge being made to their mobile telephone account, from which it is then possible for funds to be transferred to the supplier.

A problem with systems of this type is that it does provide a relatively straightforward mechanism for younger users to obtain access to undesirable material.

SUMMARY OF THE DESCRIPTION

Apparatuses and methods to facilitate customer to supplier funds transfer via premium messages are described herein. Some embodiments are summarized in this section.

In one aspect, there is provided apparatus for the reception of funds at a supplier electronically, including: a customer browser component connected to a network; a supplier browser component connected to the network; a server component connected to the network and having a database component; a first mobile cellular telephone operable by the customer and having a first telephone number; a mobile cellular operator providing mobile cellular services for the mobile cellular telephone. The server component is configured to transmit a plurality of premium rate mobile terminating text messages to the mobile cellular telephone to effect the transfer of funds for reception by the supplier, from the customer after the customer has placed an order with the supplier; and the server component is configured to transmit a notification message to a second mobile cellular telephone having a second telephone number confirming that the transfer of funds has taken place.

In a preferred embodiment, it is possible to pair a plurality of monitored telephones to one supervisor telephone.

In a second aspect, there is provided a method of receiving funds at a supplier electronically from a customer, including: transmitting a plurality of premium rate mobile terminating messages to a mobile cellular telephone to effect the transfer of funds for reception by the supplier, from the customer after the customer has placed an order with the supplier; and transmitting a notification message to a second mobile cellular telephone confirming that the transfer of funds has taken place.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 10 shows an example of a constraints file of the type identified in FIG. 9.

FIG. 15 shows a database table for recording information.

FIG. 17 details a table in database 208.

FIG. 22 shows a table of classifications.

FIG. 26 shows another table within the database.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Figure 1:
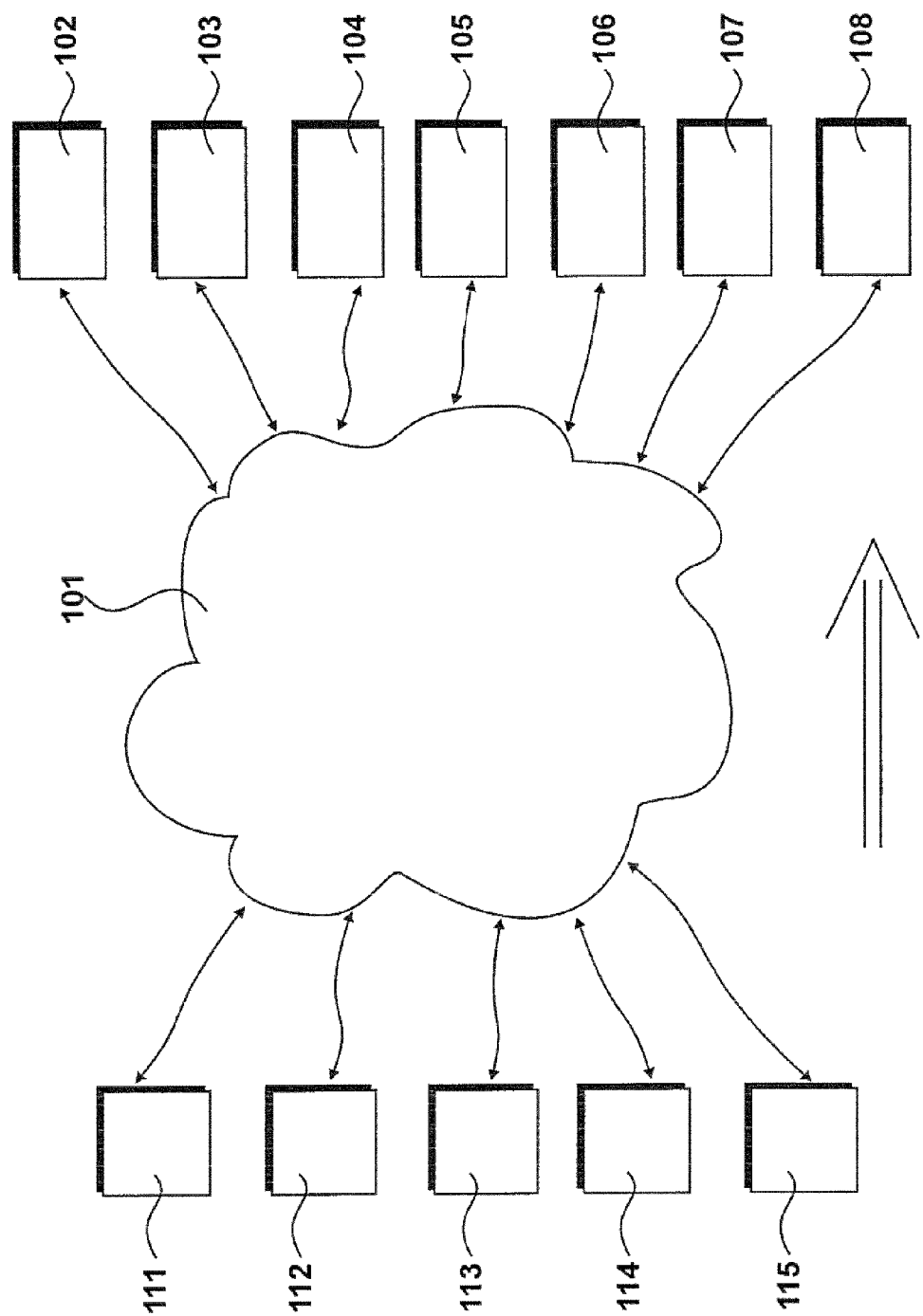
FIG. 1 shows a representation of the Internet.

A representation of the Internet 101 is illustrated in FIG. 1 in which potential customers are provided with customer browsers 101 to 108 and a plurality of suppliers are provided with supplier browsers 111 to 115. The environment therefore allows customers to place orders with suppliers for the delivery of products and/or services and for the customers to transfer funds to the suppliers in order to effect payment for the goods and/or services.

It is known practice for a transaction to be initiated by a customer, such as customer 102, by the customer making a request for a web page to be served, which provides details of a supplier's products, allows product selections to be made and facilitates payment for these products.

Figure 2:
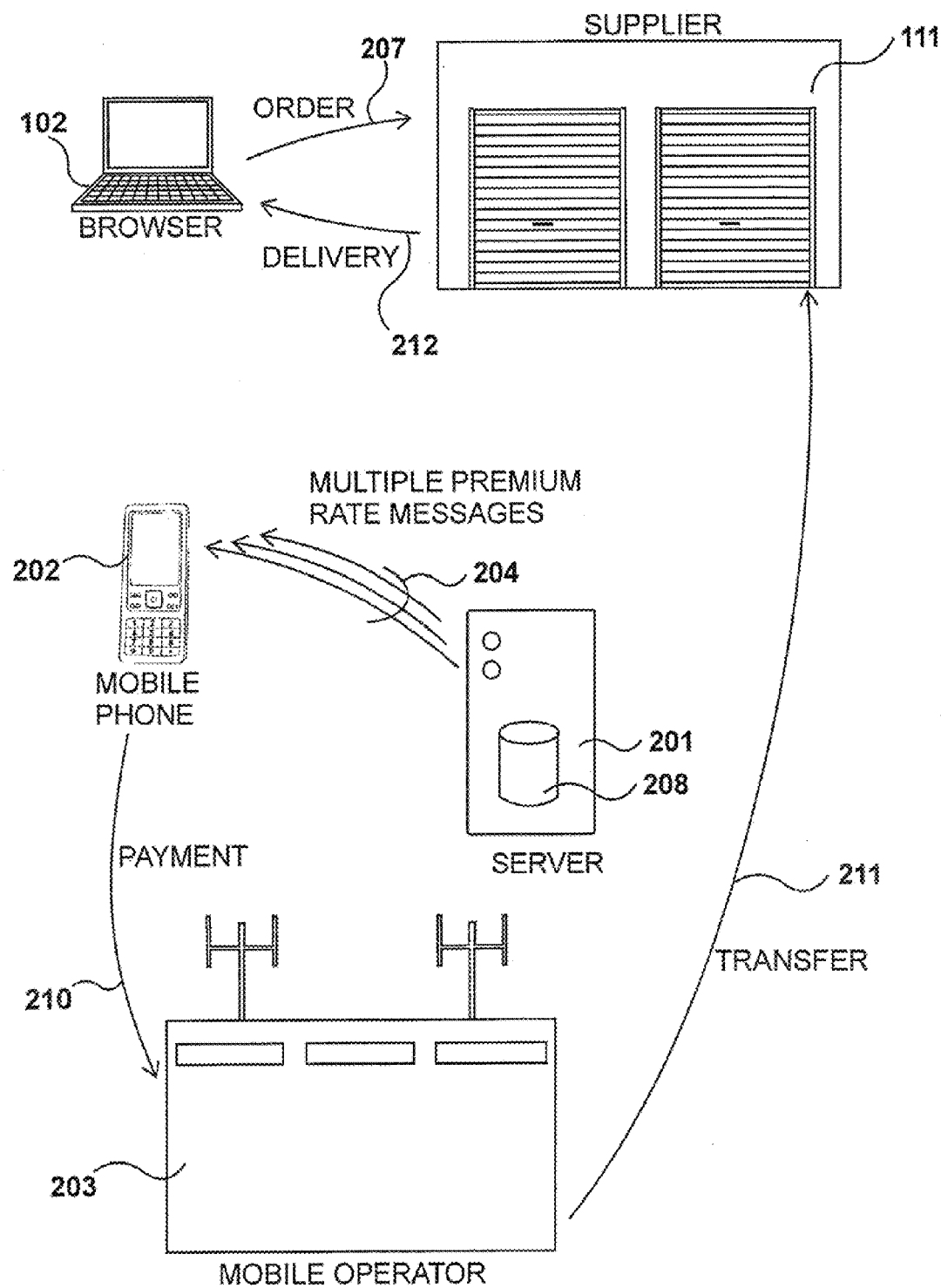
FIG. 2 shows components forming a preferred embodiment working within the environment of FIG. 1 conducted within the environment of FIG. 2.

FIG. 2 shows components forming a preferred embodiment working within the environment of FIG. 1 conducted within the environment of FIG. 2.

Within the environment identified in FIG. 1, a preferred aspect of one embodiment provides an apparatus for the electronic transfer of funds from a customer to a supplier as illustrated in FIG. 2. A customer browser component 102 is connected to the Internet 101 and a supplier server component 111 is also connected to the Internet. A service server component 201 is connected to the Internet 101 and a mobile cellular telephone 202 is operable by the customer, that is to say, the same customer who is using browser 102.

A mobile cellular operator 203 provides mobile cellular services to the mobile cellular telephone 202. The service server component 201 is configured to transmit a plurality of premium rate mobile terminating text messages 204 to the mobile cellular telephone to effect a payment from the customer (at 102) to the supplier (at 111) after the customer has placed an order with the supplier.

The mobile terminating premium rate messages are included in telephone bills received by the mobile telephone owner, resulting in payment 210 being made to the mobile operator 203. Thereafter, the mobile operator 203 effects the appropriate transfer 211 to the supplier 111. The supplier 111 has now received funds and is therefore prompted to perform delivery 212 of the purchased product or service.

Figure 3:
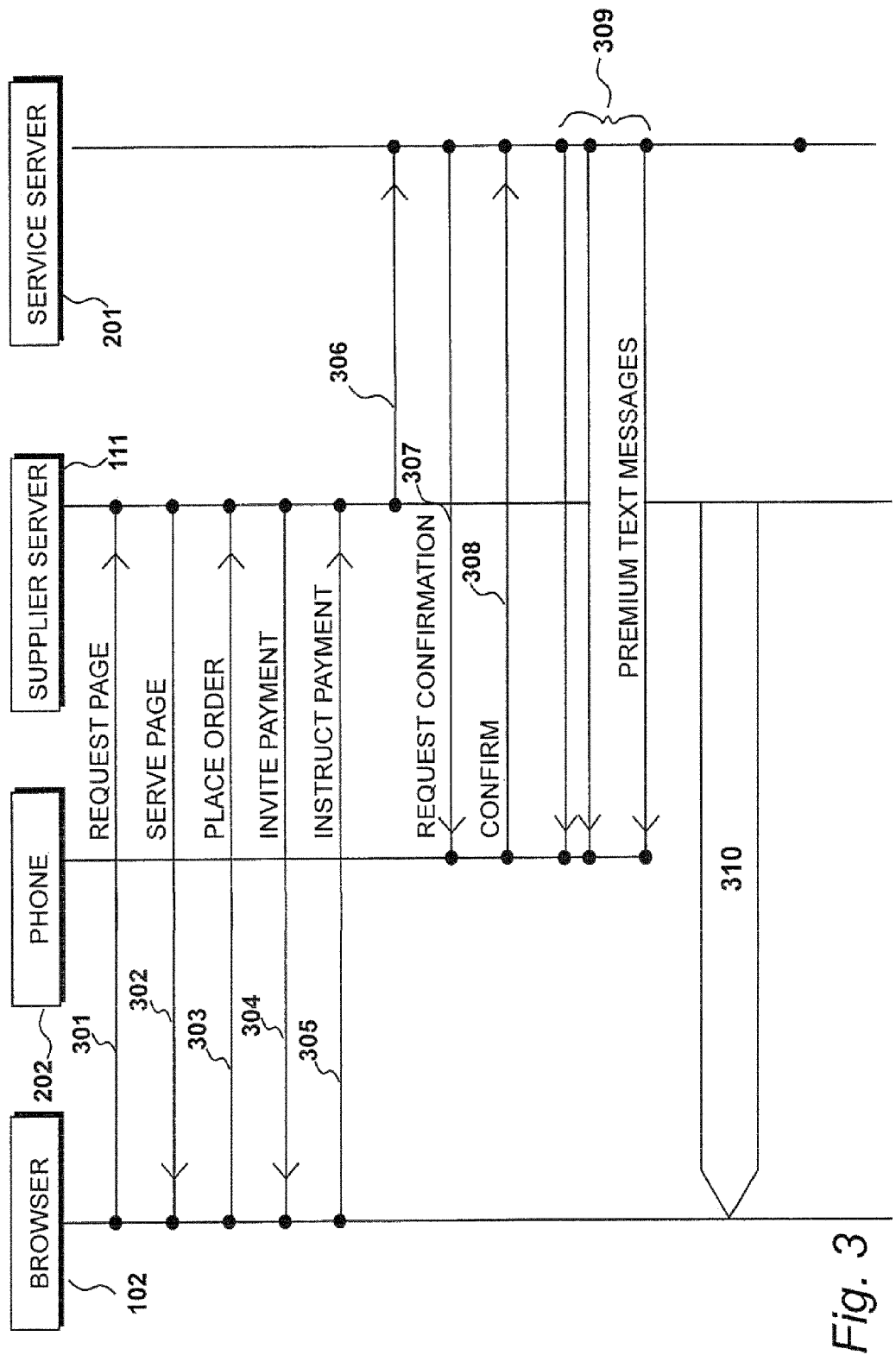
FIG. 3 shows procedures conducted within the environment of FIG. 2.

Procedures conducted within the environment of FIG. 2 are detailed in FIG. 3, in the form of a telecommunications protocol diagram. The diagram of FIG. 3 includes the browser 102, the cellular telephone 202, the supplier server 111 and the service server 201.

Initially, the browser issues a signal 301 to request a page to be supplied from the supplier server 111. In response to receiving this request, a page of data 302 is returned to the browser 102, resulting in a page being displayed to the customer at the browser 102.

In response to reviewing the served page, a request 303 for an order is conveyed to the supplier server 111. In response to receiving this order, the product server 111 makes an invitation 304 for a payment to be made. In response to receiving an invitation for a payment to be made, the browser makes an instruction 305 in order to effect the payment. Thus, in accordance with one embodiment, payment is made by issuing premium rate text messages to the mobile telephone.

The supplier server 111 issues an instruction 306 to the service server 201. The service server 201 issues a request 307 to the mobile cellular telephone 202 for a confirmation to the effect that the payment is to be made. Thus, in order to achieve payment by the mobile telephone mechanism, it is necessary to enter a telephone number and it is also necessary for the purchaser to be in possession of the mobile telephone so that the purchaser may effect that confirmation.

The mobile cellular telephone therefore issues a confirmation 308 back to the service server 201 (via the cellular telephone network) to the effect that the purchase has been confirmed.

Upon receiving the request confirmation 308, the service server schedules and issues a plurality of premium rate mobile terminating text messages 309. Thereafter, the product, virtual product or service is sent from the supplier to the purchaser, as illustrated by arrow 310.

Figure 4:
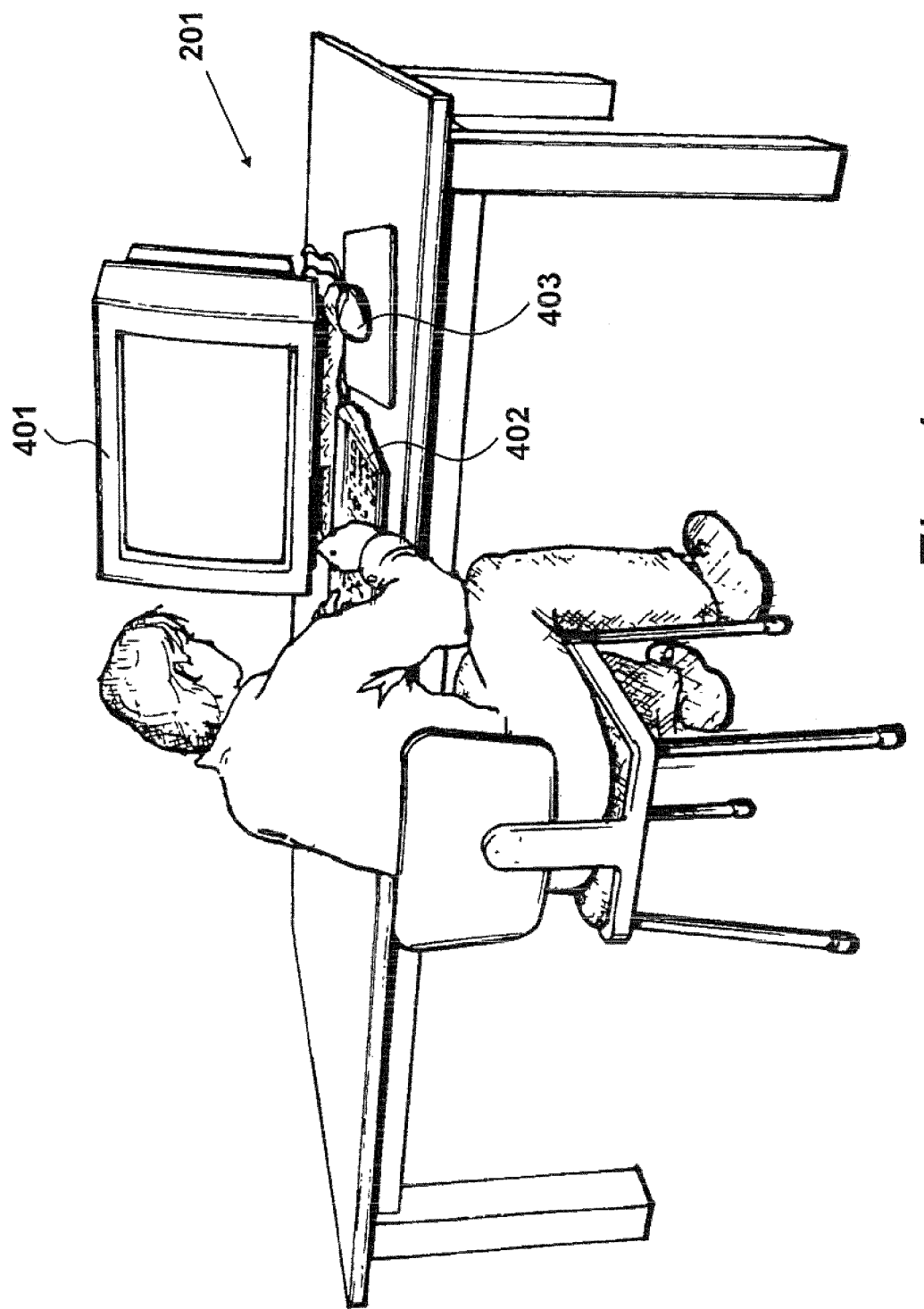
FIG. 4 shows an example of a browser.

An example of a browser 201 is illustrated in FIG. 4, in which a visual display unit 401 is provided to allow web pages to be displayed. In addition, user input is facilitated by a keyboard 402 and a mouse 403. The applicant has become aware that browser environments are particularly attractive for displaying catalogues of goods and receiving orders for goods. However, problems arise in terms of effecting payment over the Internet due to security concerns. The mobile telephone system described herein thereby provides an alternative mechanism for payment.

Generally, the relationship between customers and mobile providers is a strong relationship built on mutual trust. Within the Internet environment it is unlikely for this level of trust to exist. Furthermore, it is not necessary for the user to have access to a credit card or to even possess a credit card. Furthermore, it has been found that the browser environment is not very successful when a supplier requests information back from a user. The present preferred embodiment allows information to be returned to suppliers easily via the customer's mobile cellular telephone.

In the example shown in FIG. 4, the browser takes the form of a desktop computer but equally it could take the form of a laptop computer or similar device. It is also envisaged that the browser and mobile telephone text messaging services could be constrained within a unified product, such as a high level mobile device.

Figure 5:
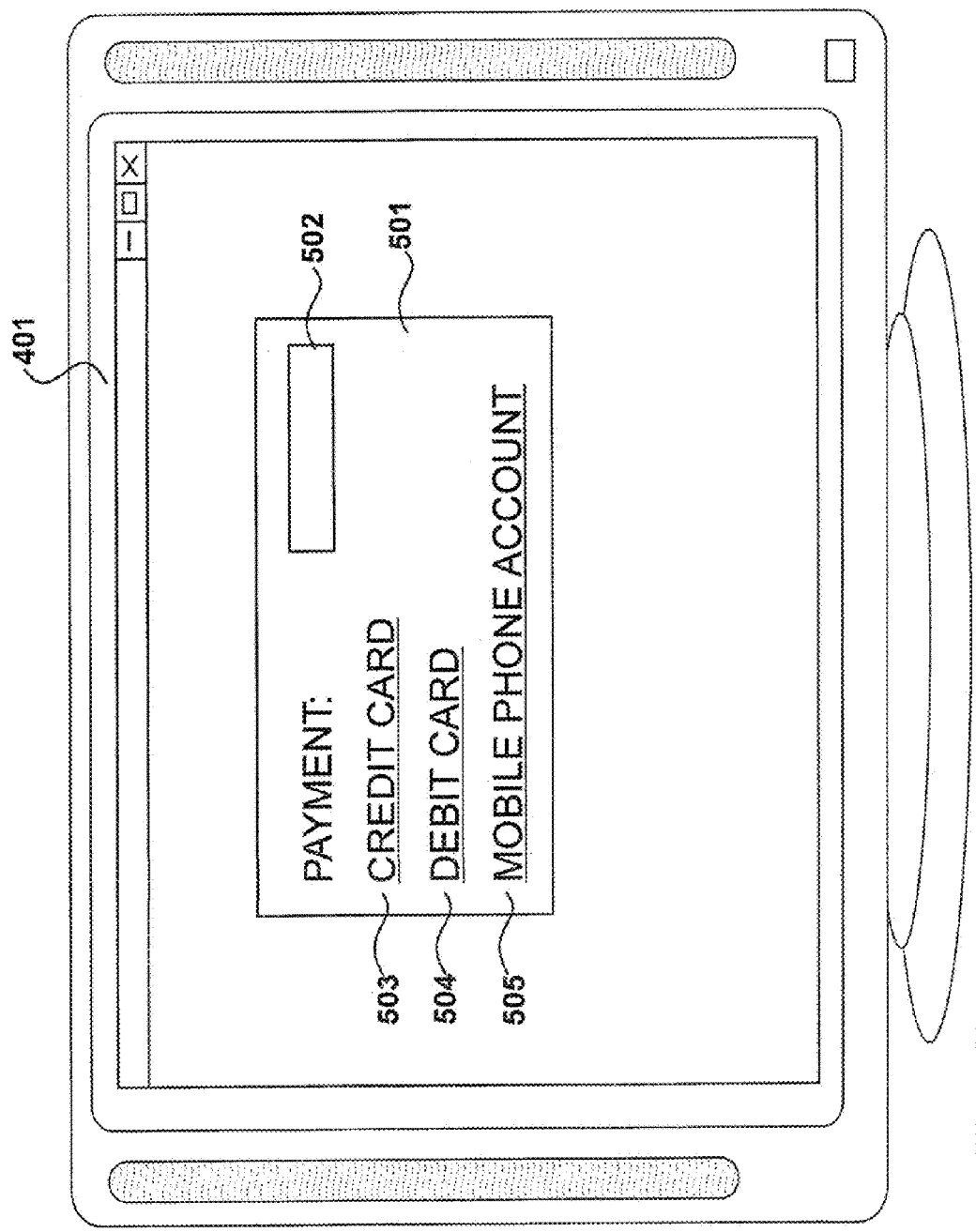
FIG. 5 details the visual display unit identified in FIG. 4.

FIG. 5 details the visual display unit 401 identified in FIG. 4. The visual display unit 401 in FIG. 5 shows an image relevant for initiating the process of making a payment. Display 501 includes a field 502 in which the current price is displayed. The user is then prompted to identify a means of payment, which in this example shows a credit card link 503, a debit card link 504 and the mobile telephone account link 505. In practice, many of these links may be repeated for different credit card types, for example, and often each credit card link would include its associated logo or graphical representation, etc.

Figure 6:
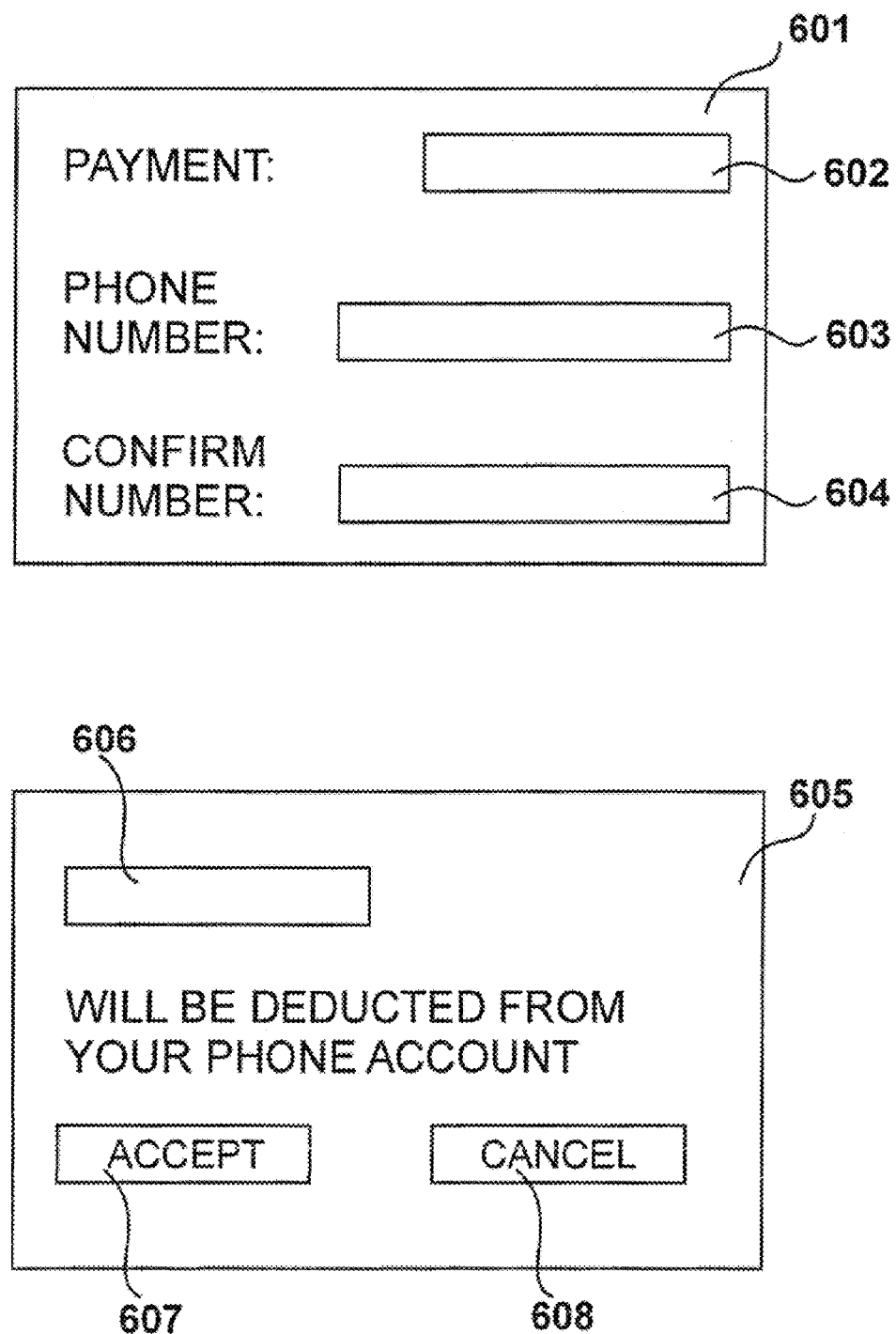
FIG. 6 details graphical user interfaces displayed by the visual display unit identified in FIG. 5.

FIG. 6 details graphical user interfaces displayed by the visual display unit identified in FIG. 5.

Having clicked through on link 505 (as shown in FIG. 5) screen 601 is displayed, that also includes a field 602 identifying the required payment. Having clicked through for this type of payment, it is possible that the total payment figure may have increased so as to include an additional charge for effecting payment via the mobile cellular telephone network. Thus, assuming a user wishes to continue, the user is invited to enter their cellular telephone number in a field 603 and the user may be asked to confirm this number in a further field 604. After confirming the payment, a further screen 605 may be displayed, subject to the particular implementation of the application.

Screen 605 includes a field 606 again identifying the total payment. The screen then continues to say that this amount will be deducted from the telephone account and a user is invited to accept the transaction by clicking button 607 or declining the transaction by clicking cancel button 608.

Figure 7:
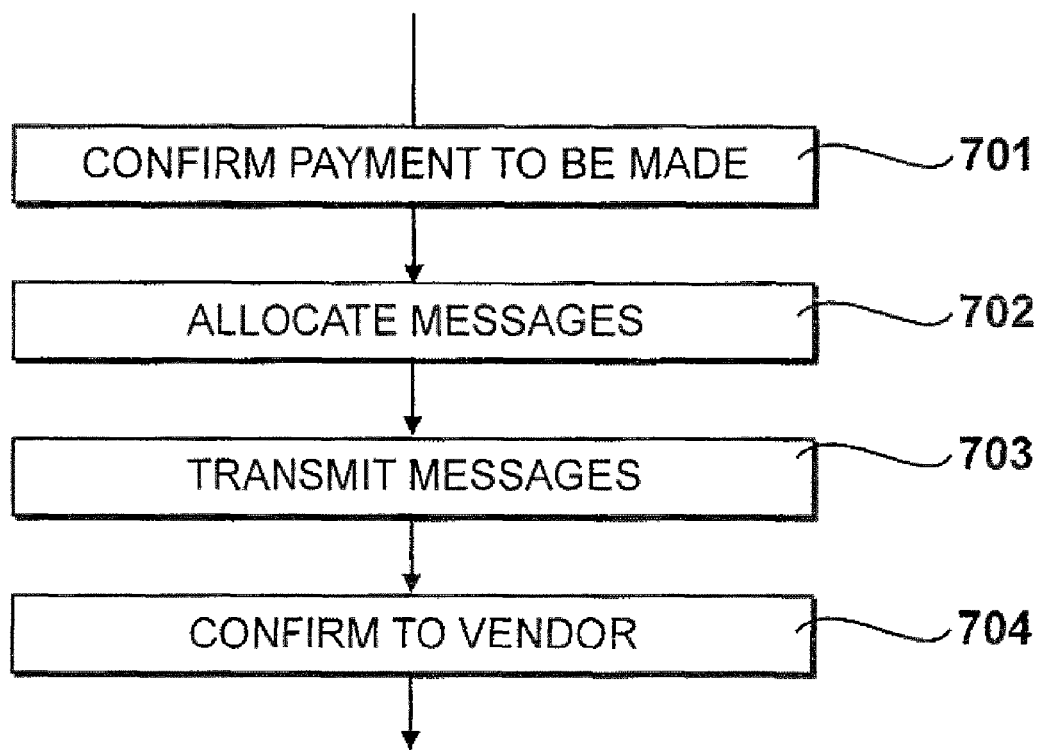
FIG. 7 shows procedures implemented by a service server.

Procedures implemented by the service server 201 are identified in FIG. 7. The service server provides for the operating of a payment via the Internet in which details are received, of a transaction, from a product server 111 identifying a price to be paid by the customer. Details of the customer's mobile telephone are received at the service server and thereafter a plurality of premium rate text messages are transmitted to the mobile telephone to effect that payment.

In response to receiving instructions 306, the service server 201 seeks confirmation from the mobile cellular telephone in operation 701 to the effect that payment is to be made.

Upon receiving confirmation 308, messages are allocated in operation 702, and in operation 703 the premium rate messages are transmitted with confirmation to the supplier being provided in operation 704.

Figure 8:
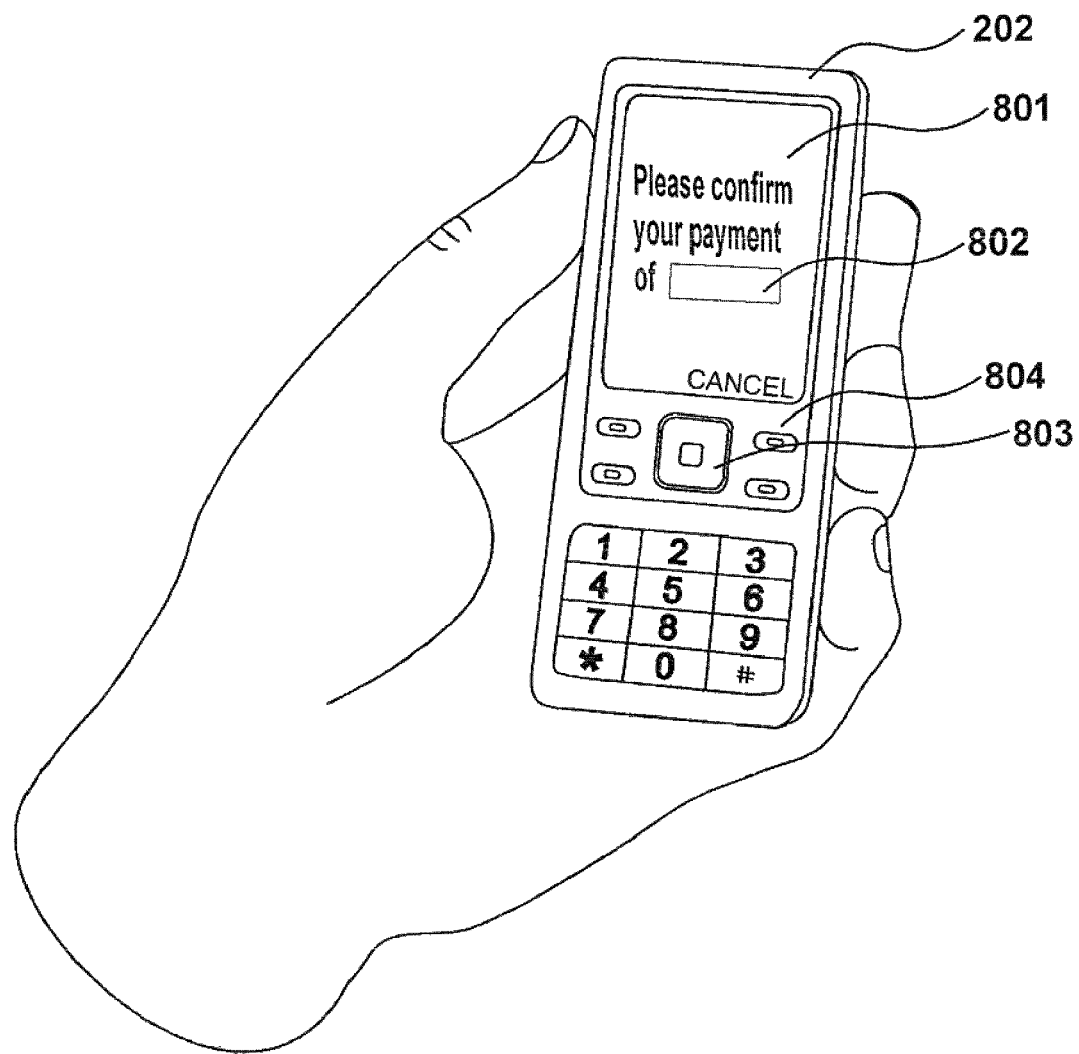
FIG. 8 details procedures for confirming a payment identified in FIG. 7.

FIG. 8 details procedures for confirming a payment identified in FIG. 7.

The result of procedure 701 for confirming the payment is illustrated in FIG. 8, in which the mobile cellular telephone 202 receives a message displayed on the mobile telephone display 801. In this example, the message states "please confirm your payment of" and the amount to be paid is displayed in field 802. In this example, it is possible to confirm the payment by operating the central navigation button 803. Alternatively, the transaction may be cancelled by the operation of a cancel button 804.

The confirmation of the payment creates a mobile originating message. This message may incur a modest charge for transmission over the mobile network. In this example, a dedicated mobile telephone is shown. However it should be appreciated that the mobile telephone designation also includes other devices with mobile telephony functionality.

Figure 9:
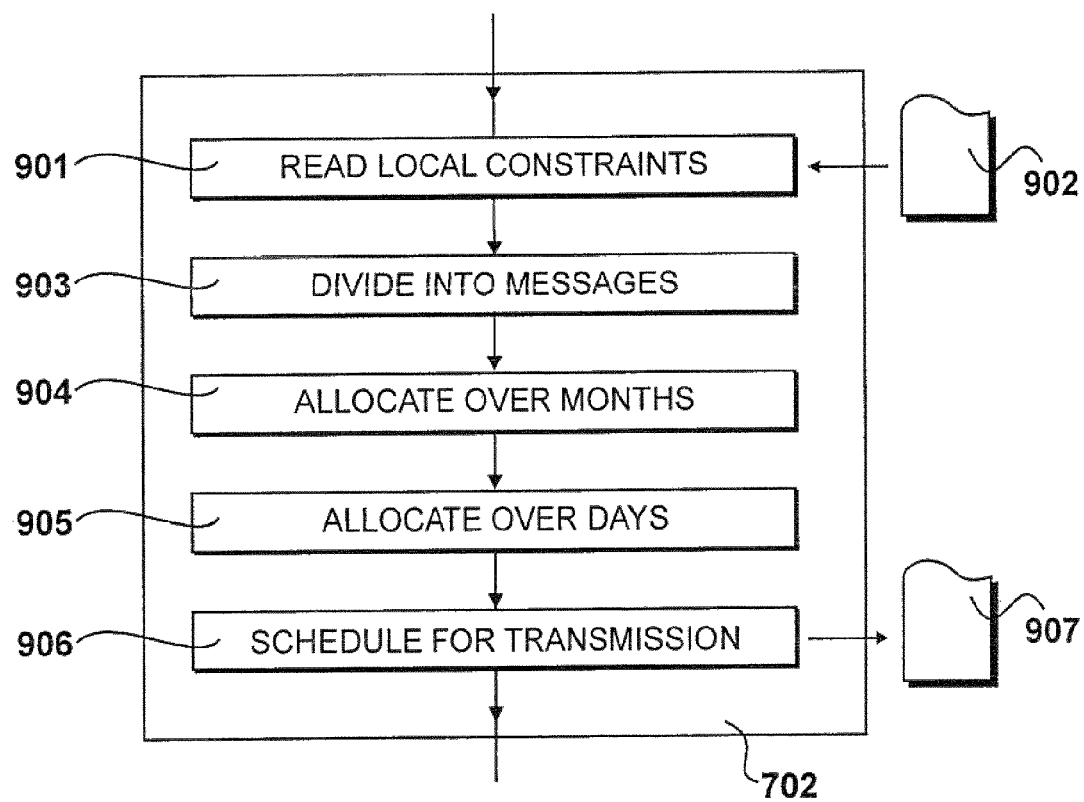
FIG. 9 details procedures for the allocation of messages identified in FIG. 7.

FIG. 9 details procedures for the allocation of messages identified in FIG. 7.

Procedure 702 for the allocation of messages is illustrated in FIG. 9. In operation 901 a file 902 of data is read that identifies appropriate local constraints for the transaction. Alternatively, these details may be supplied from an appropriately configured database. The local constraints are relevant for the particular country in which the financial transaction is taking place, including appropriate currency for the transaction and other regulations relating to the use of premium rate messages.

The constraints contained within file 902 identify the specific examples of premium rate messages that may be deployed, along with a level of payment that is associated with each of these messages. In addition, the constraints also specify maximum transaction values, usually restricting the total level of transactions that may occur during a day and often also identifying a maximum level of transactions that may take place over a month, given that many customers are billed on a monthly basis.

In this example, an operator may specify that total transactions for a day must not exceed 30 dollars and total transactions for the month must not exceed 400 dollars. Typically, these constraints are applied across an operator's network and are not allocated on a customer-by-customer basis.

In operation 903 the total value of the transaction is divided into a plurality of messages such that in combination, the value of the messages adds up to the total value of the transaction.

In operation 904 an allocation is made over a number of months. If the total value of the transaction exceeds a monthly limit, it is necessary to spread the transmission of the messages over two or more months.

In operation 905 an allocation is made over a number of days. Again, if either total transactions or monthly transactions exceed the total transactions allowed, the actual transmissions must take place over a number of days, with a plurality of messages being allocated for each individual day within the batch.

It is possible for the maximum transmissions to occur within, for example, three days over a particular month. It is possible that the transactions could occur over more days, until the allocation for the month is reached. If the allocation for the month is reached, it is then necessary to continue making transmissions upon entering the next month.

In operation 906 the transmissions are scheduled, resulting in the generation of a transmission schedule 907.

FIG. 10 shows an example of a constraints file 902 of the type identified in FIG. 9. This defines a total transmission value for the day and a total transmission value for the month. In addition, it identifies valid premium rate message codes. Thus, in this example, at line 1001 a code 861000 effects a charge of 50 cents, as shown at line 1002. Similarly, a code of 861100 effects a charge of 1 dollar and as illustrated at line 1003, a charge of 1.50 dollars is effected as a result of transmitting code 861110. A code of 861111 results in a charge of 3 dollars and similarly a five dollar charge results from the transmission of code 861112.

An example of a displayed field 802 is also shown in FIG. 10 which, for the purposes of this illustration, indicates a charge of 25.50 dollars.

Figure 11:
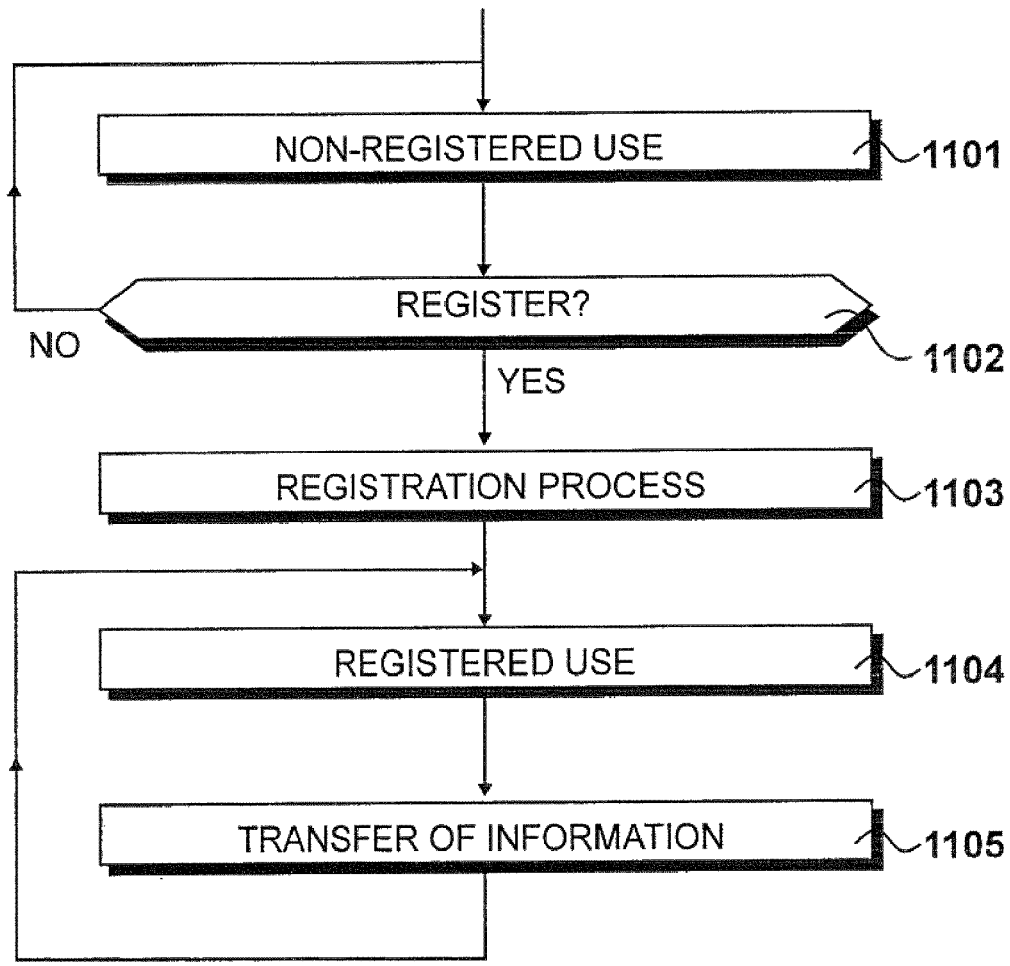
FIG. 11 shows various use types.

FIG. 11 shows various use types.

The present preferred apparatus performs a method of transferring funds electronically in which a plurality of premium rate mobile text messages are transmitted from the server to a mobile cellular telephone to effect payment from the customer to the supplier after the customer has placed an order with a supplier via a network connected browser. A database is populated at the server with an identification of each customer's telephone number. It is then possible for customers to make purchases via this mechanism in a non-registered mode of operation. However, in accordance with a preferred aspect of one embodiment, the customer is prompted to supply additional personal data. Thus, as illustrated in FIG. 11, nonregistered use of the system is illustrated at 1101. After this nonregistered use, a question is asked at 1102 of a customer as to whether they wish to register their use of the system. Thus, when answered in the negative, further nonregistered use may occur at 1101.

If, however, the customer agrees to the registration process (the question asked in operation 1102 being answered in the affirmative), a registration process is performed in operation 1103.

Thereafter, registered use occurs in operation 1104, and thereafter in operation 1105, transaction information may be transferred to suppliers and third parties.

Figure 12:
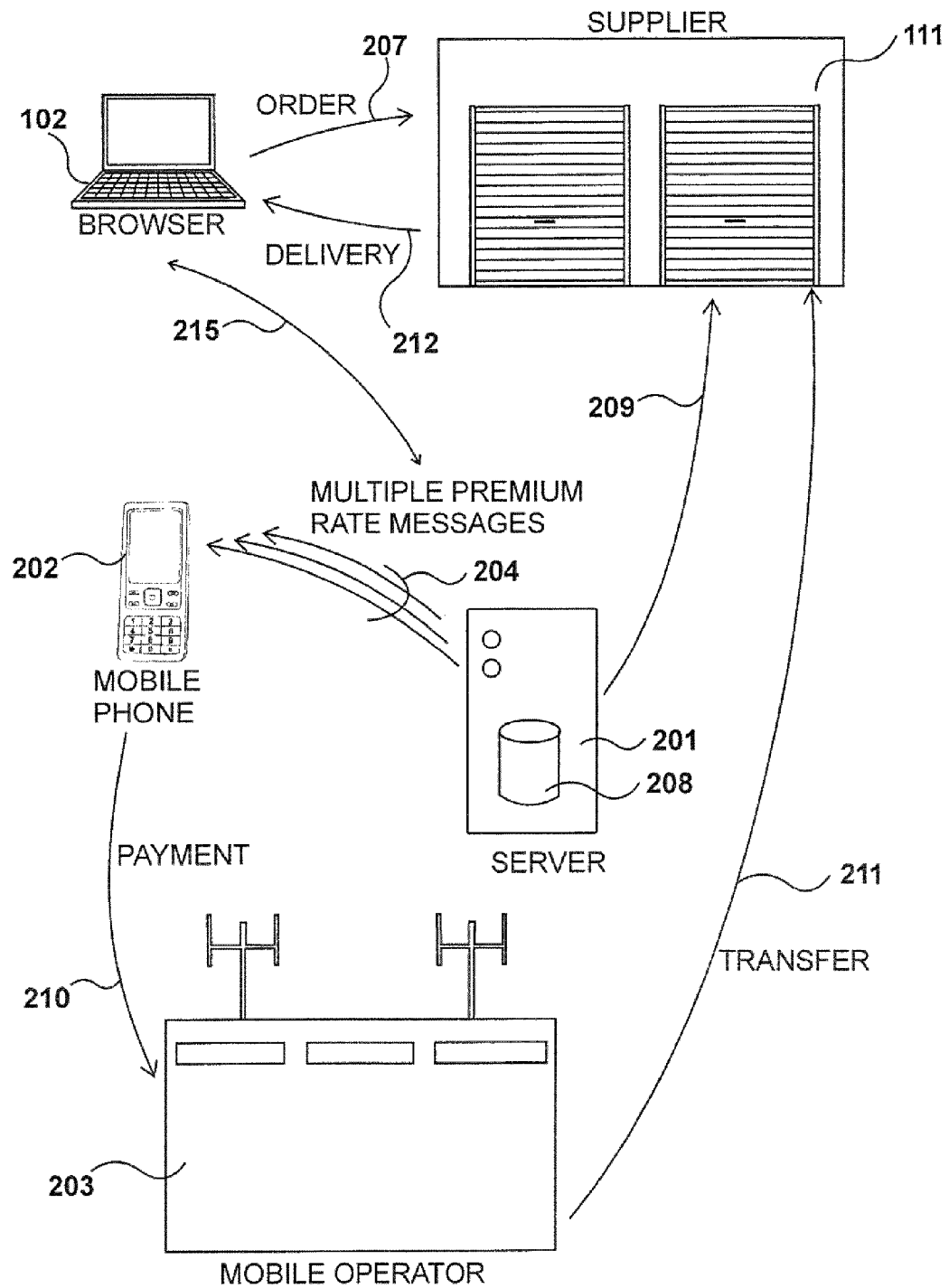
FIG. 12 shows an environment substantially similar to that of FIG. 2, implementing one embodiment.

FIG. 12 shows an environment substantially similar to that of FIG. 2, implementing one embodiment. Multiple premium rate mobile terminating text messages 204 are shown being issued from the server 201 to the mobile cellular telephone 202. However, in addition, the user also receives an invitation 215 or a prompt to supply additional personal information.

Figure 13:
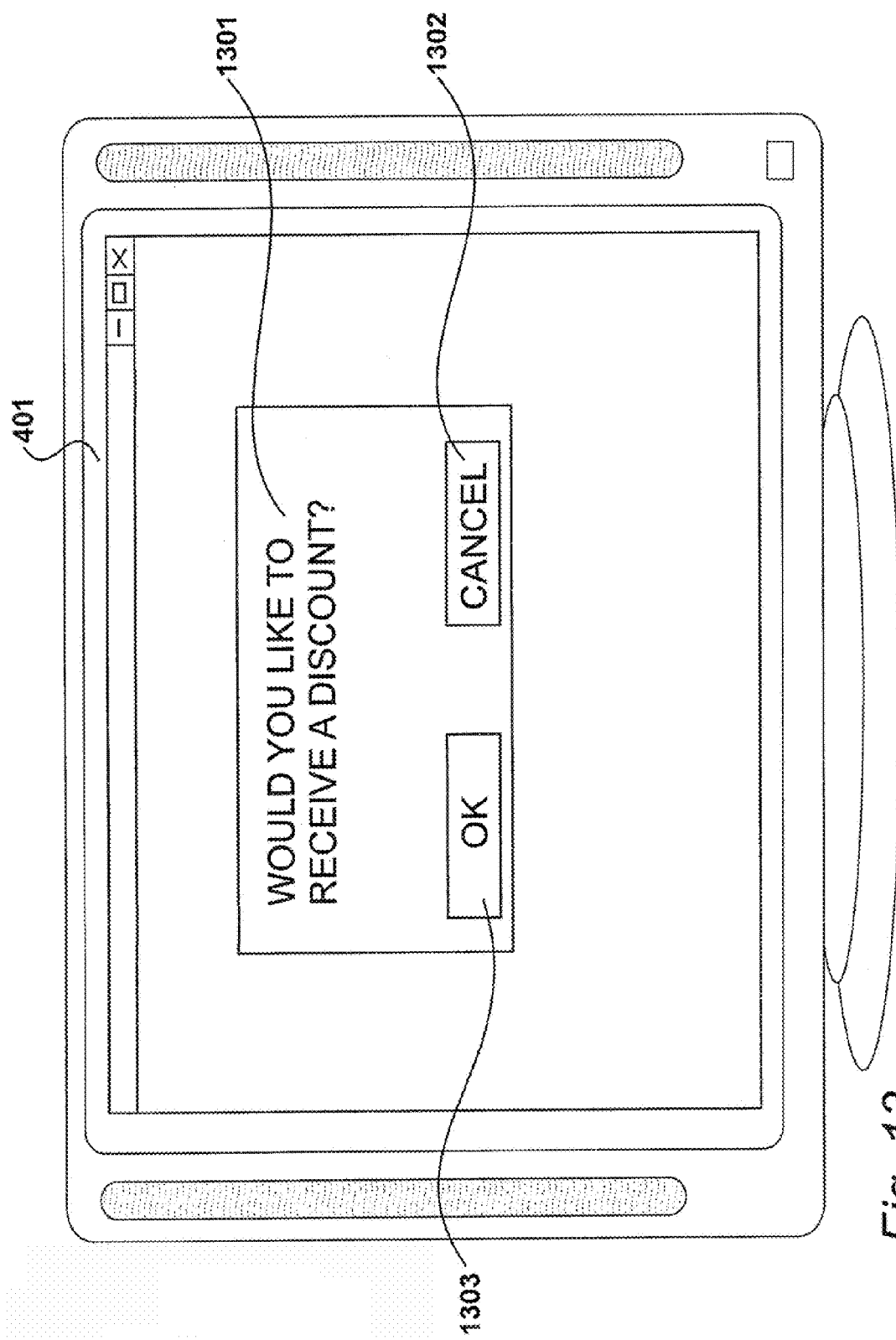
FIG. 13 shows an example of an invitation of the type identified in FIG. 12.

FIG. 13 shows an example of an invitation 215 of the type identified in FIG. 12. In the example of an invitation 215 to a browser illustrated in FIG. 13, the browser receives a message 1301 which states "would you like to receive a discount?" In response to receiving this, it is possible for the user to press a cancel button 1302. Alternatively, pressing an "OK" button 1303 results in an affirmative response being returned to the server 201.

Figure 14:
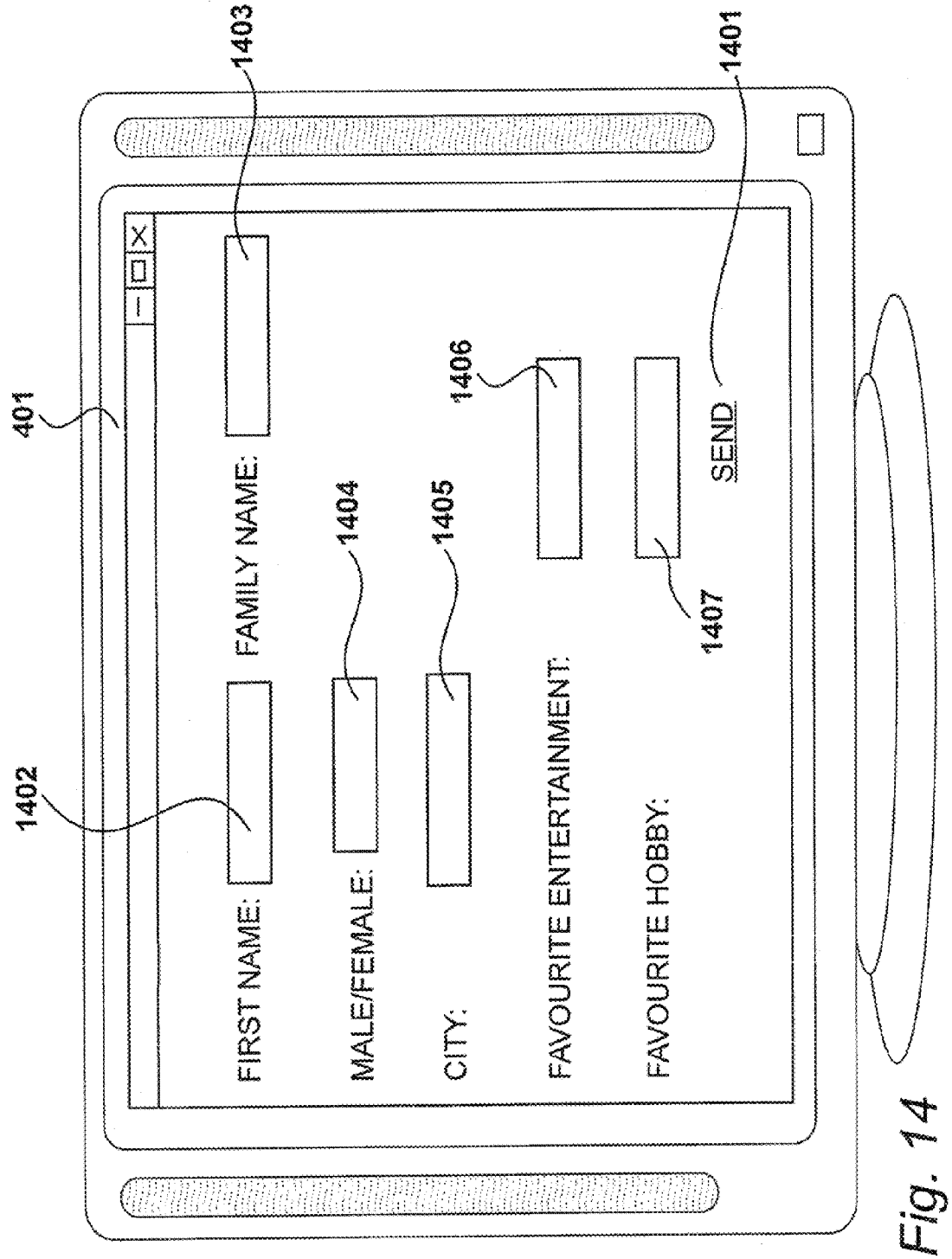
FIG. 14 shows a graphical user interface for receiving information.

FIG. 14 shows a graphical user interface for receiving information. In a preferred embodiment, personal information is received from the user via the user's browser 102.

When the user makes use of browser 102 to effect payment via this method again, the user is presented with a screen of the type shown in FIG. 14. At the browser, the user selects fields within the graphical user interface using mouse 403 and enters the text by keyboard 402. The user then applies a mouse click to the "send" link 1401.

In this example, a first name is received at field 1402 and a family name is received at field 1403. These are text boxes allowing any text entry to be made. Further fields 1404 to 1407 are provided in the form of pull down boxes from which predefined selections can be made. Thus, in field 1404 the user is invited to identify their gender and at field 1405 they are invited to identify their city of residence. Similarly, pull down box 1406 invites the user to identify a favorite entertainment and a similar pull down box at 1407 allows a favorite hobby to be identified within the field. As previously stated, the user then selects link 1401 and the information is transmitted over channel 215 to the database 208 within server 201.

FIG. 15 shows a database table for recording information. Within database 208 a table is created so as to record the information received from each user. At column 1501 a unique identification is given for the user which is then recorded against the user's telephone number at column 1502. For nonregistered use, only columns 1501 and 1502 are populated. Alternatively, it would be possible for telephone numbers to be recorded in a separate linked table.

Columns 1503 to 1508 only become populated after a registration process. Thus, a given name and a family name are recorded at columns 1503 and 1504 respectively in response to receiving free text entries 1402 and 1403.

Gender is recorded at 1505 (from entry 1404), with city, entertainment and hobbies being recorded at 1506, 1507 and 1508, in response to entries from 1405, 1406 and 1407.

Figure 16:
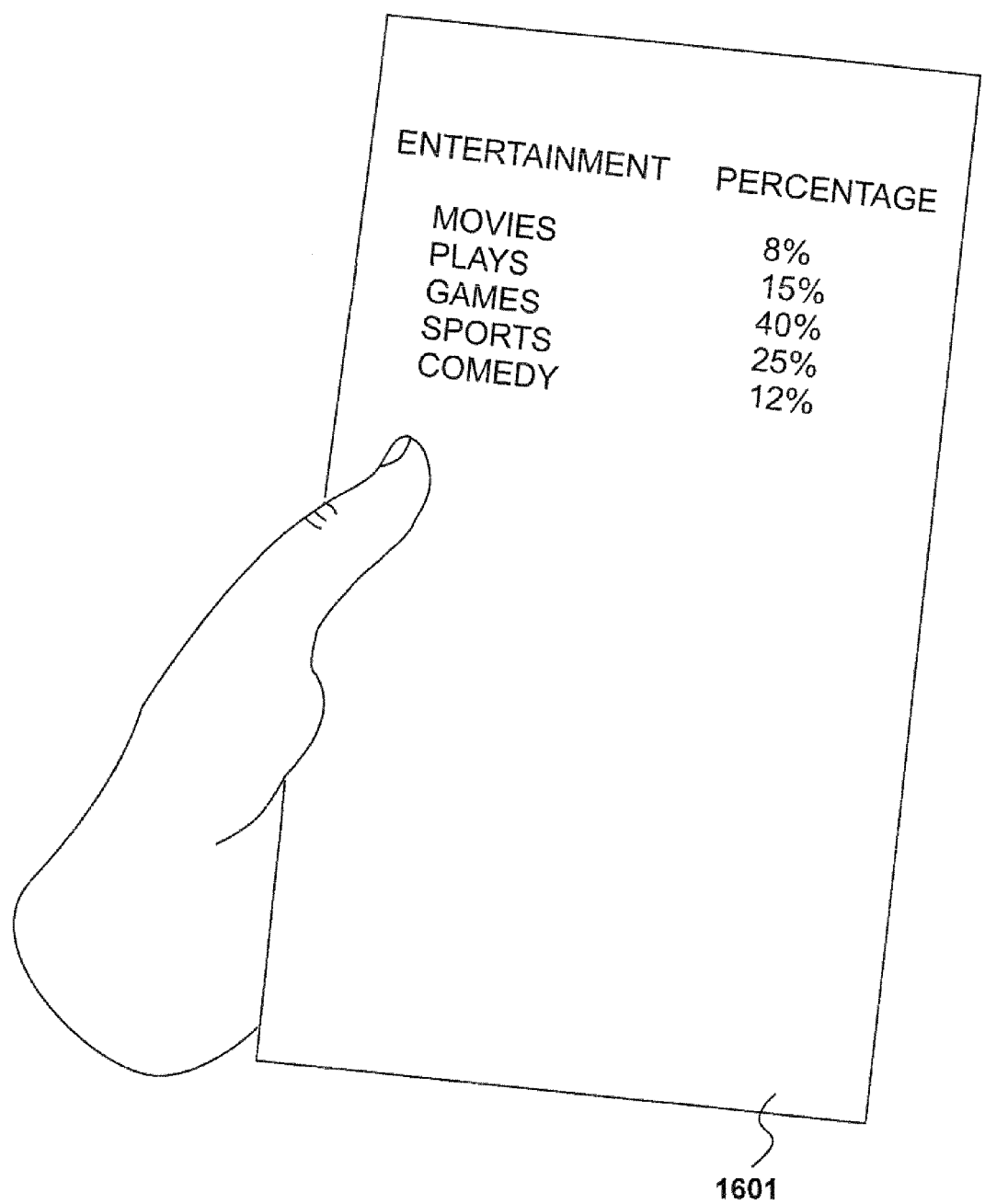
FIG. 16 shows the generation of a report.

FIG. 16 shows the generation of a report. It is envisaged that personal data will be collected over a period of time and a plurality of tables may be included within a database of substantially similar configuration to that shown in FIG. 15. Registered users are identified as such, and in a preferred embodiment the user is provided with a discount each time the service is used. As previously described with respect to FIG. 10, the possibility of providing an additional charges for the service was described, and in a preferred embodiment this charge may be made against nonregistered users whereas registered users may be able to make use of the service for free.

Similarly, suppliers, such as supplier 111, may be in a position to make use of the service effectively for free, but a charge may be required if they wish to obtain user transaction data, essentially for marketing purposes. In a preferred embodiment, it is possible for a supplier to receive transaction data relating to the specific transactions made with them. Alternatively, average data may be of greater assistance such that specific telephone numbers are not required, whereupon it will be possible to provide a broader range of data, including data obtained from transactions relating to other suppliers.

Furthermore, in an alternative preferred embodiment, given that the personal nature of the data has been removed, it would be possible for this accumulated data to be made available to external parties not actually themselves registered as a supplier. Furthermore, the availability of this data may encourage suppliers to make this service available to their customers.

In a first embodiment it is possible for suppliers to gain access to database 208. Alternatively, it may be possible for the suppliers to receive designated reports, such as report 1601 of the type shown in FIG. 16.

In the example shown in FIG. 16, a supplier is interested in advertising entertainment packages and therefore wishes to know which type of entertainments are preferred by their existing customers. Thus, by referring to the information collected within column 1507, for a number of users, it is possible to perform calculations to determine percentages. Thus, in this example, the supplier receives information to the effect that 40% of their users prefer playing computer games, compared to the other options of watching movies, watching plays, watching sports or watching comedy. Thus, with this information on hand, the supplier may make an educated decision to the effect that further website promotions would best be directed at computer games in preference to DVDs and movie downloads, etc.

FIG. 17 details a table in database 208, which includes a table for recording each financial transaction. Nonregistered use as indicated at 1101 and registered use as indicated at 1104 result in the table shown in FIG. 17 being populated.

Table 1701 includes a first column 1702 for recording the identity of the user. Thus, in this example, each user is given a unique number.

The supplier from whom the user is purchasing product/service is identified in column 1703, followed by an indication of the product 1704. Column 1705 records a net price and column 1706 records a discount from the net price. This discount represents a discount given for being a registered user and does not relate to any discounts given by the supplier themselves; these being included in the net price figure. Thus, thereafter, column 1707 records an actual price.

In this example, user 4781 has purchased product from supplier Smith, Jones and Big Inc. Thus a total of three products have been purchased, identified in this example as P2, P4 and P5.

Figure 18:
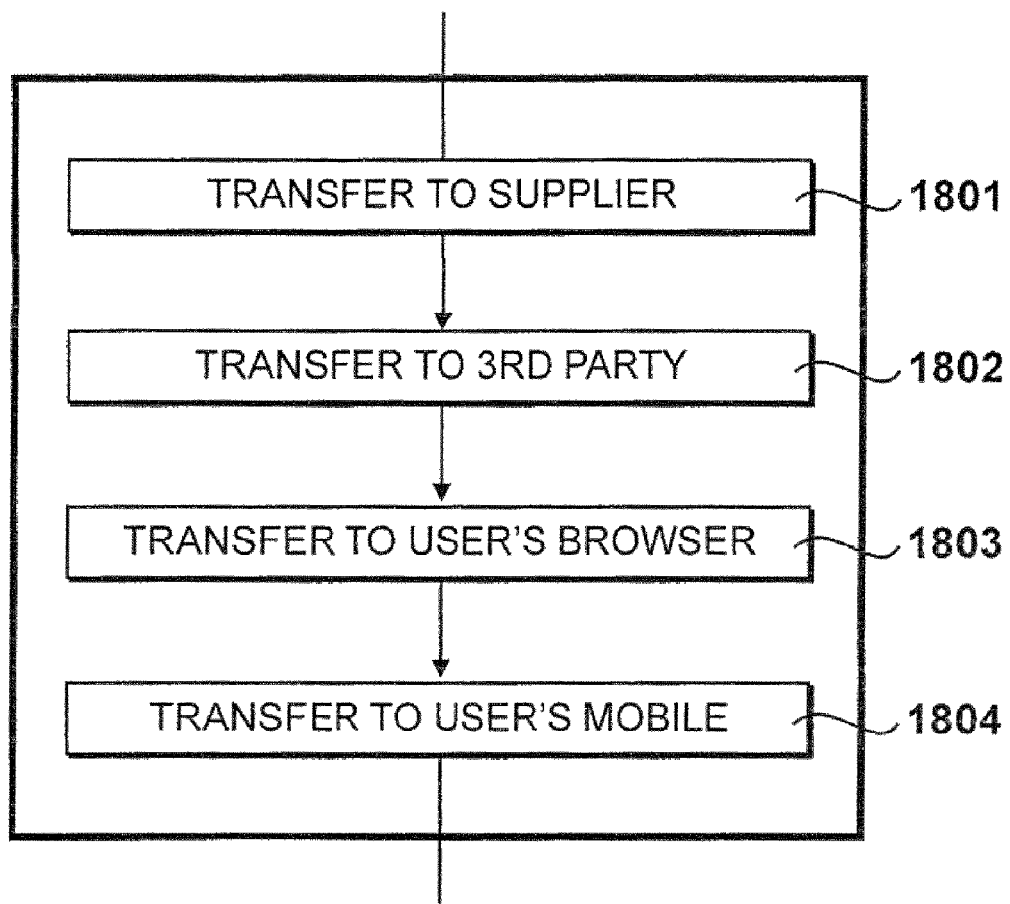
FIG. 18 shows an example of procedures for the transfer of information.

FIG. 18 shows an example of procedures for the transfer of information, as indicated in operation 1105.

An example of procedures for the transfer of information, as indicated in operation 1105, is detailed in FIG. 18.

In operation 1801, information is transferred to a supplier over channel 209, for example. This may result in the supplier receiving customer related information such as that illustrated in FIG. 16.

In operation 1802 information is supplied to third parties. This information is aggregated and does not identify specific customers. The third party does not necessarily make use of the service but it is possible for the third party to obtain this information for a price.

In operation 1803 details of the user's transactions are transferred to the user's browser. Thus, in a preferred embodiment, it may be possible for registered users to obtain this information without additional charge.

In operation 1804 the transfer of user information to a user's mobile cellular telephone is illustrated. This may be available without charge, or a predetermined number of transmissions per month may be available without charge, after which a charge will be made to the user.

Figure 19:
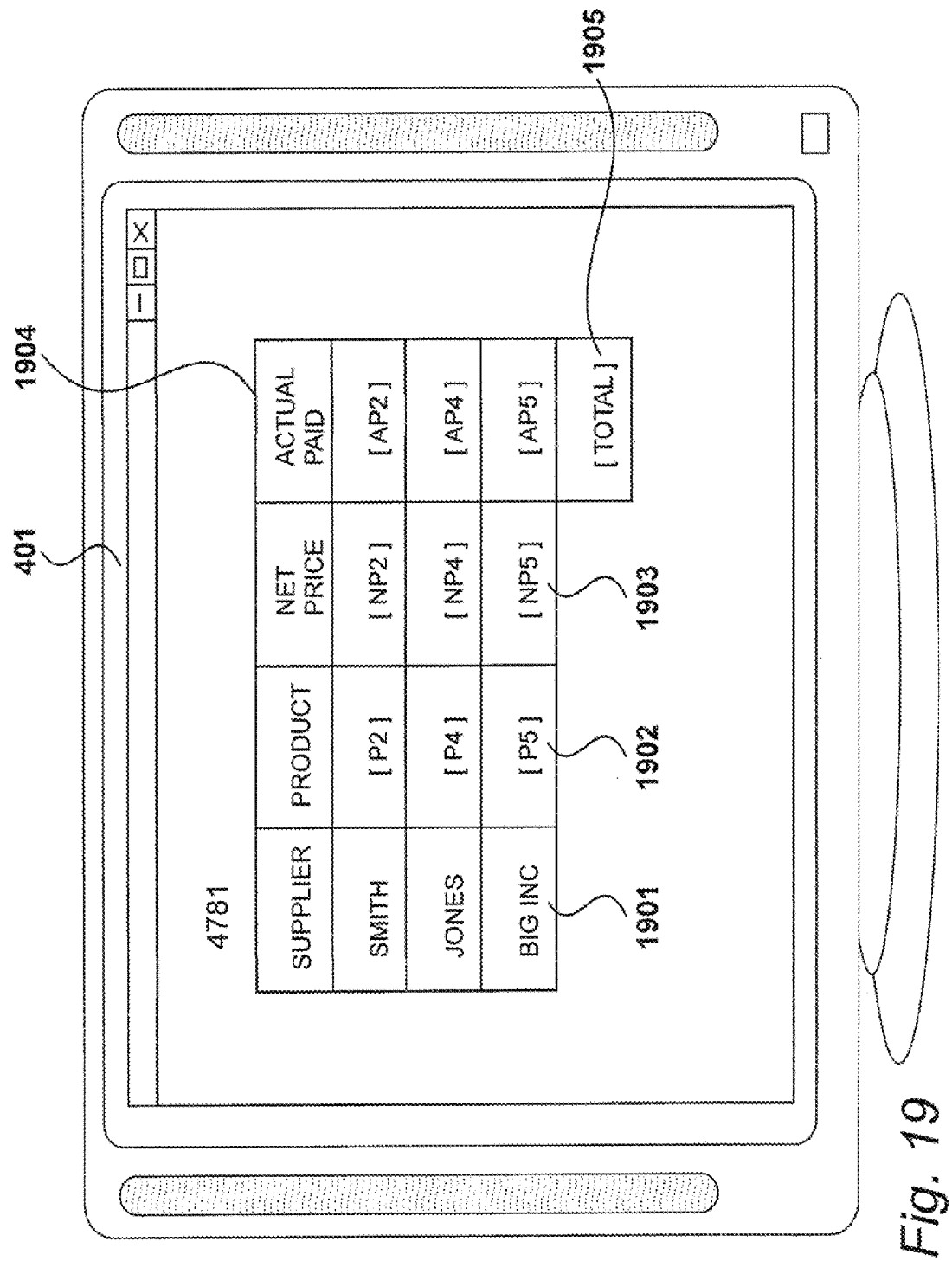
FIG. 19 illustrates the transfer of information to a user's browser.

Operation 1803 for the transfer of information to the user's browser results in data being displayed at the user's browser as shown in FIG. 19.

User 4781 logs on to the appropriate website and supplies appropriate information to allow the log on procedure to be completed. Thus, for example, it is likely that a user would identify their telephone and a password. Thus, having entered this information, details of recent transactions are supplied to the user.

In the example shown, a statement takes the form of a table. This includes a first column 1901 for identifying the name of the supplier, a second table 1902 for identifying the product, a third table 1903 for identifying the net price and a fourth table 1904 for identifying the actual amount paid.

As it can be seen from FIG. 19, the totality of the data available in table 1701 has been filtered so as to show only the transactions for user 781. Furthermore, in this example, the actual discount figure (from column 1706) is not included. However, the system does identify the actual price paid and at 1905 a total is included, possibly for all transactions up to transactions included on the last mobile telephone statement. Thus, a payment is made for mobile telephone services as illustrated at 210, resulting in the transactional data being recorded as paid. Thereafter, in the preferred embodiment, only unpaid transactions are included. In this way, it is possible for a user to be kept up to date as to where they stand in anticipation of the next mobile cellular bill. Furthermore, in an alternative embodiment it is possible for a user to obtain historical records, possibly on a monthly basis.

Figure 20:
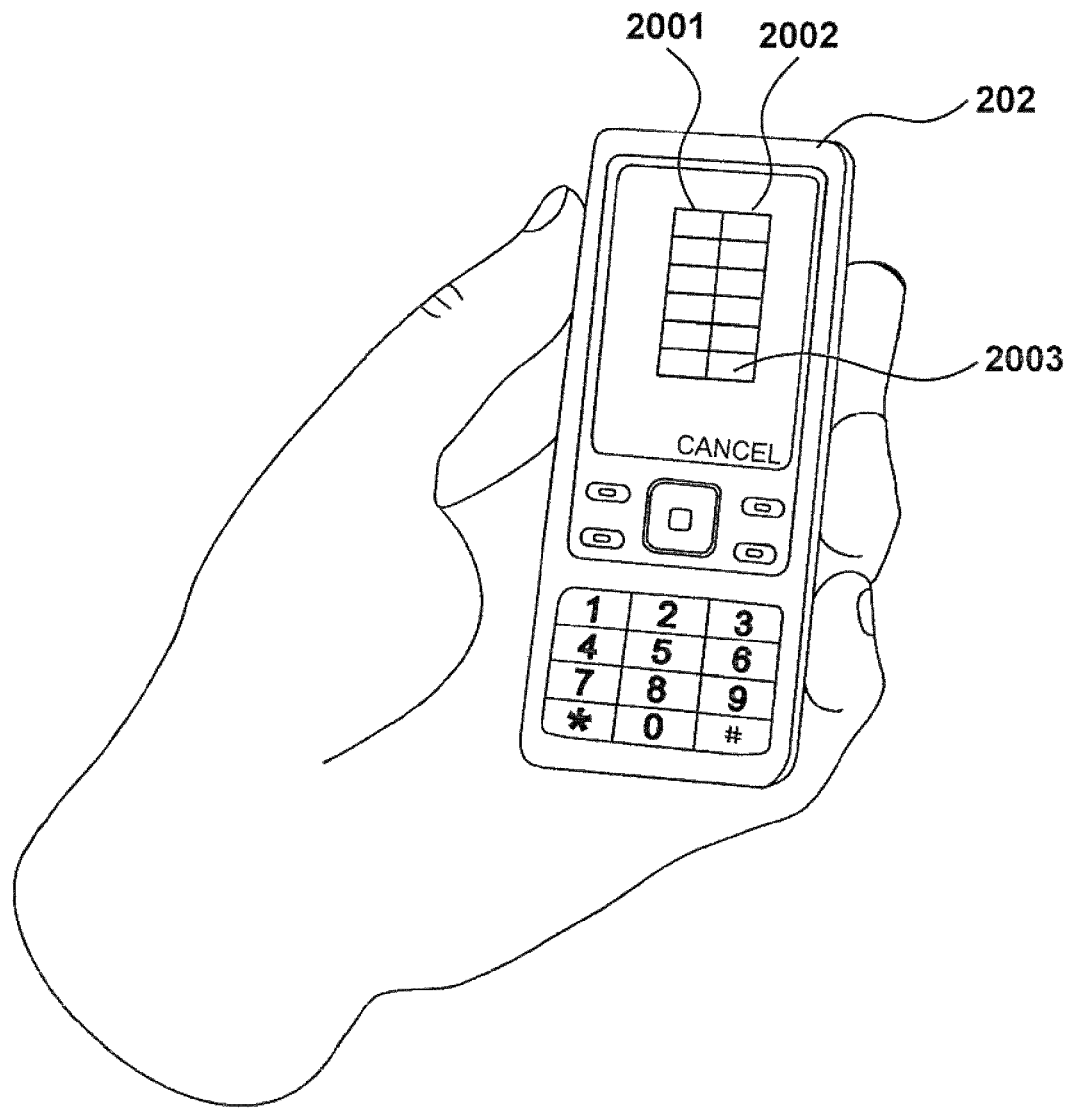
FIG. 20 shows the display of information at a user's mobile cellular telephone.

In response to the transfer of data to the user's mobile telephone, as identified in operation 1804, information is displayed on the mobile cellular telephone 202, as shown in FIG. 20. In this example, the information is shown in a table having a first column 2001 and a second column 2002. In this example, column 2001 identifies the product I (P2, P4, P5 etc) and column 2002 shows the actual price paid AP2, AP4 and AP5 etc. The mobile telephone display may also include a total, shown at 2003, which would be of particular use to users given that it would indicate how much they have spent in a particular month so as to assist them with budgeting.

Figure 21:
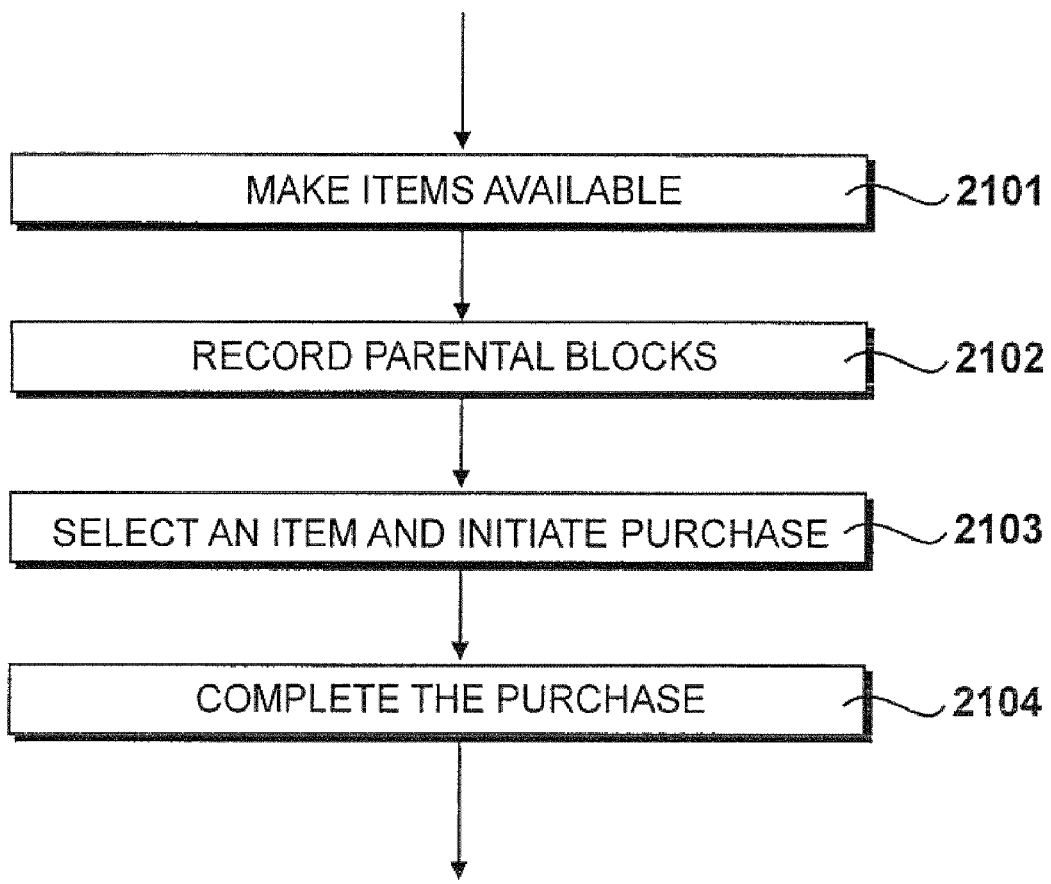
FIG. 21 shows procedures performed in accordance with a preferred embodiment.

FIG. 21 shows procedures performed in accordance with a preferred embodiment.

The apparatus described provides for the electronic transfer of funds from a customer to a supplier. In the environment, a plurality of customer browser components are connected to a network and a plurality of supplier browser components are connected to the network. A server component is connected to the network and the server has a database component. A respective mobile cellular telephone with a telephone number is owned by each of the customers or users. In addition, there is a mobile cellular operator configured to provide mobile cellular services to the mobile cellular telephones. The server component is configured to transmit a plurality of premium rate mobile terminating text messages to the mobile cellular telephone. In addition, the server component is configured to populate the database with an identification of each customer's telephone number.

The server component is also configured to receive a classification of the nature of products/services sold by each supplier and is also configured to populate the database component with a table associating suppliers with their respective classifications. The database includes an identification of classifications for each of the telephone numbers and the server allows or prohibits the transmission of the text messages to effect payment dependent upon the identification of stored classifications for the requesting telephone number.

The overall procedures performed to achieve a sale within the environment of the preferred embodiment are illustrated in FIG. 21.

In operation 2101 items that include products, virtual products and services are made available. However, in order for a product or service to be available for sale using the method described herein, it is necessary for each product or service to be provided with a classification, primarily identifying an appropriate age at which the product or service may be received. In many instances, such classifications are readily available, such as for movies and computer games. Furthermore, many examples of items sold in this way will not be restricted and as such an appropriate designation is given.

In operation 2102 a record is made of parental blocks. Thus, it is possible for a parent to provide a mobile telephone to, for example, a 14 year old with an appropriate block being recorded such that the 14 year old may receive anything considered appropriate for anyone over 11 or over 13 but not over 15.

In operation 2103 a selection of an item is made and a purchase procedure is initiated, as described with respect to FIGS. 5 and 6.

Thereafter, in operation 2104, the purchase is completed which, in accordance with the preferred embodiment, includes a check to determine whether or not the purchase has been blocked.

An example of a table of classifications is shown in FIG. 22. The first column 2201 of the table includes a list of classification abbreviations and the second column 2202 shows an appropriate description. Thus, in this example, a classification of 12 indicates that the material is suitable for anyone over 11. A classification of 14 indicates that it is suitable for anyone over 13, a classification of 16 confirms that it is suitable for anyone over 15 and a classification of 18 means that it is only appropriate for an adult.

A classification of 0 indicates that the material is not restricted in any way. Furthermore, in this embodiment, a classification of S is included showing that the product relates to a specialist activity. Specialist activity classifications allow subgroups to be defined in which additional requirements need to be met in order for the purchase to be allowed. For example, such a classification could be included for pharmaceuticals, firearms or even magic tricks.

Figure 23:
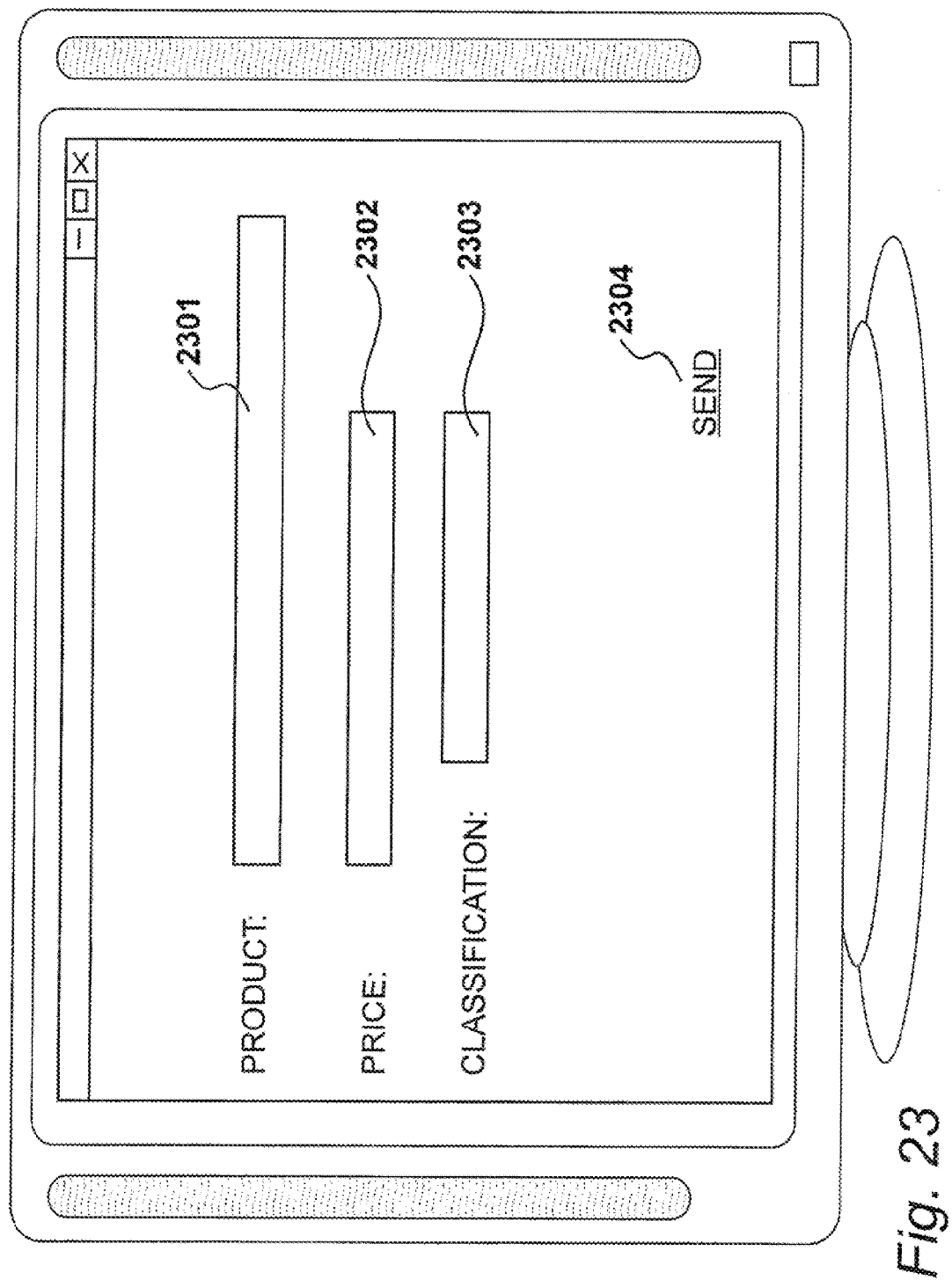
FIG. 23 shows a graphical user interface for receiving information from a seller.

FIG. 23 shows a graphical user interface for receiving information from a seller.

In order to make items available for sale through the mechanism described herein, it is necessary for a seller to complete a registration procedure for each product, using a browser displaying a graphical user interface of the type shown in FIG. 23.

In the interface of FIG. 23, a product designation is provided at field 2301. Similarly, a price is specified at field 2302 and in accordance with this preferred embodiment, a classification is provided at field 2303.

In some embodiments an independent check may be made of the classification. Alternatively contractual conditions with suppliers may state that details of further inventory will not be received from a supplier if misclassifications are included.

Having populated fields 2301 to 2304, the supplier clicks on link 2304, effecting a sending of the entered information to the server database 208.

Figure 24:
FIG. 24 illustrates a table within database 208.

FIG. 24 illustrates a table within database 208.

At the database 208, each product is given a unique product identification number. Each unique product may be given a product identification number, with the same identification number being used for the same product when sold by different sellers. Alternatively, the product identification number may be unique for each product sold by each seller.

Within the database 208, tables are constructed identifying the product identification numbers and product descriptions, prices and classifications, etc. However, in addition, indexes are established to facilitate the rapid checking of product identification numbers against their recorded classification.

A table 2401 is shown in FIG. 24 in which each product identification number is recorded in a column 2402 with its appropriate classification, as supplied by the seller using field 2303, being recorded in column 2405. Thus, as can be seen from this example, product 00003 has a classification of 12 with product 0004 having a classification of 18.

Figure 25:
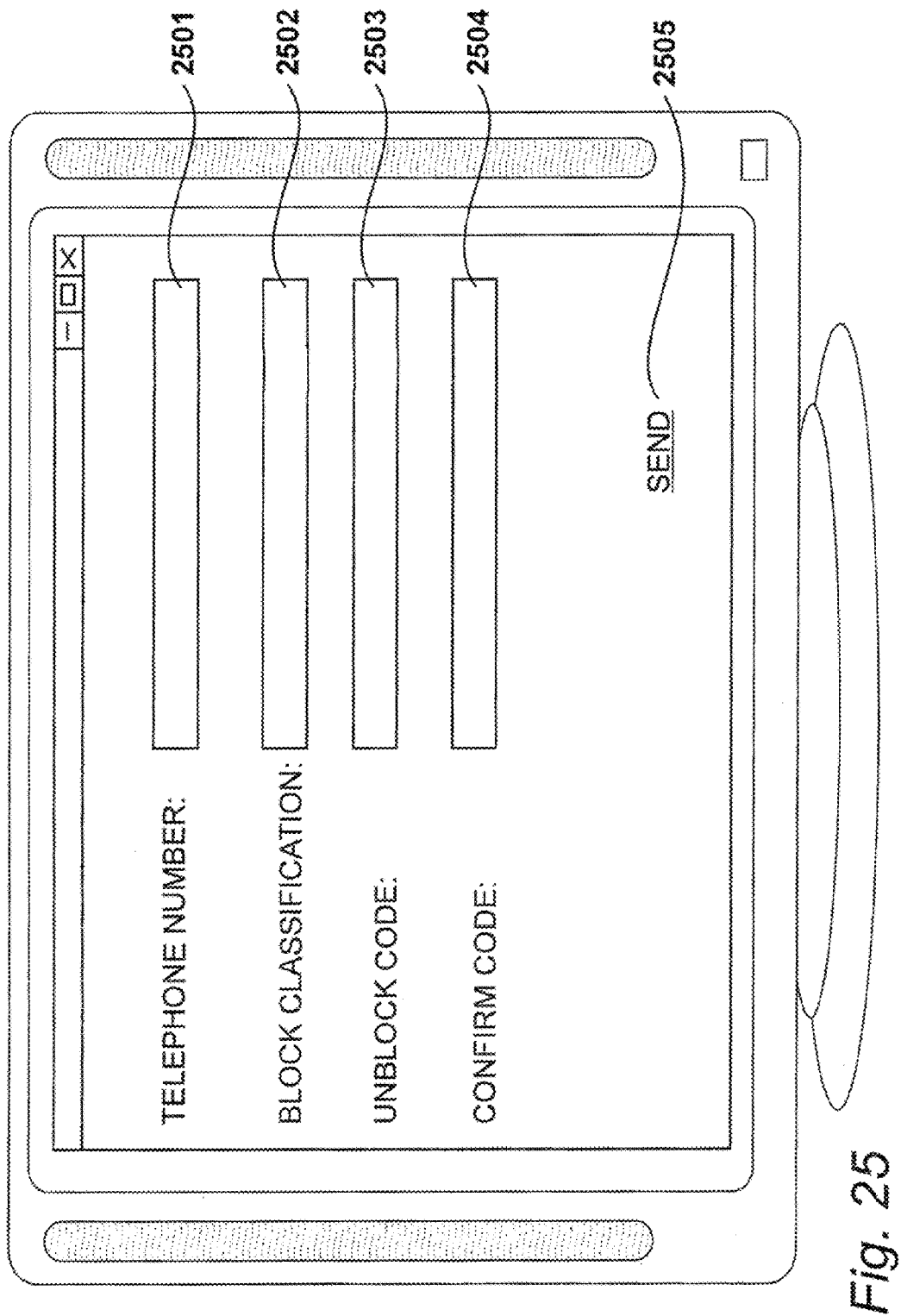
FIG. 25 shows procedures for recording parental blocks.

Procedures for the recording of parental blocks identified in operation 2102 are detailed in FIG. 25. In response to requesting a parental block, a browser used by a parent, for example, is provided with a graphical user interface of the type shown in FIG. 25. Using this graphical user interface, a telephone number is entered in field 2501. In field 2502 a classification block is specified. Before a block has been imposed, it is assumed that no restrictions exist. The highest level of blocking is to enter a classification of 12. With classification of 12, only non-restricted items may be paid for using this service. With classification 12 blocked, this automatically blocks 14, 16 and 18. Similarly, with a block classification of 14, only non-restricted and 12 classification products may be purchased. Similarly with a block of 16, only items classified 12 and 14 may be purchased and with a block classification of 18, adult material will be blocked but items classified 12, 14 and 16 can be purchased.

In a preferred embodiment, additional measures may be required in order to verify the status of the blocked person imposing the block. Thus, for example, in order to effect a block it may be necessary for the parent to be in actual possession of the mobile telephone.

Having identified the block classification, the parent is required to specify an unblock code in field 2503 followed by a confirmation of this code in field 2504. This code is kept secret by the parent and will be required if the parent wishes to adjust the level of blocking or remove the blocking altogether. Thus, it is not possible for a child using the mobile telephone to remove the block unless they are aware of the unblock code. Furthermore, should the unblock code become known to the user, it would be relatively straightforward for the parent to repeat the blocking procedure using an alternative code.

Having completed the fields in the user interface, the parent clicks on link 2505, resulting in the information being supplied to the database 208.

FIG. 26 shows another table within the database. In response to receiving parental block information, a table 2601, as shown in FIG. 26, is populated at the database 208.

Blocking information is received continually and in no particular order. However, in order to facilitate the fast searching of this information, a primary key is established at the database 208. Thus, a first column 2602 records the blocked classifications in order, followed by an identification of the user ID in column 2603.

Figure 27:
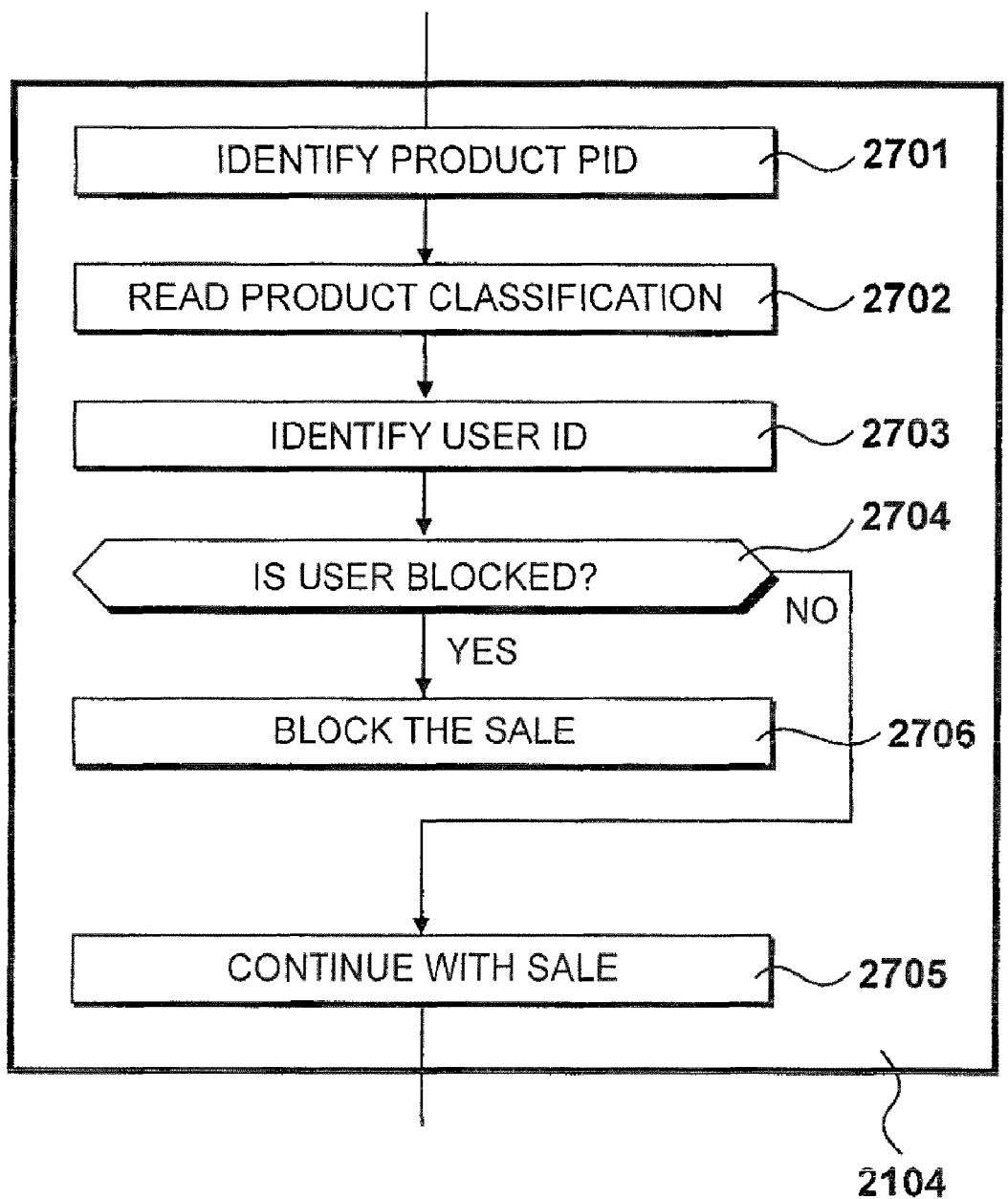
FIG. 27 illustrates a preferred method.

Referring to the procedures identified in FIG. 27, having received data from interface 601, an identification of the product is made in operation 2701. This information will have been collected by the system during the product selection process and therefore the product ID should be included within data contained within the web page.

In operation 2702 the product classification is read with reference to table 2401. Thus, if product 0002 has been selected, the system is now aware that this has a classification of 0. Similarly, if product 00004 has been selected, the system is aware that the product has a classification of 18.

In operation 2703 the user ID is identified, and in operation 2704 a question is asked as to whether the user has been blocked. The classification for product 00004 is recorded as 18, so if this product is selected, blocked classes 18 are considered in table 2601. In this example, this will show that user 0002, 0006, 021, 031 and 164 should be blocked. In addition, any user with classifications 12, 14 or 16 would also be blocked.

If the sale has not been blocked, the sale will continue in operation 2705. However, if, for example, user 0006 attempts to purchase product 0004, the question asked in operation 2704 will be answered in the affirmative and the sale will be blocked.

Figure 28:
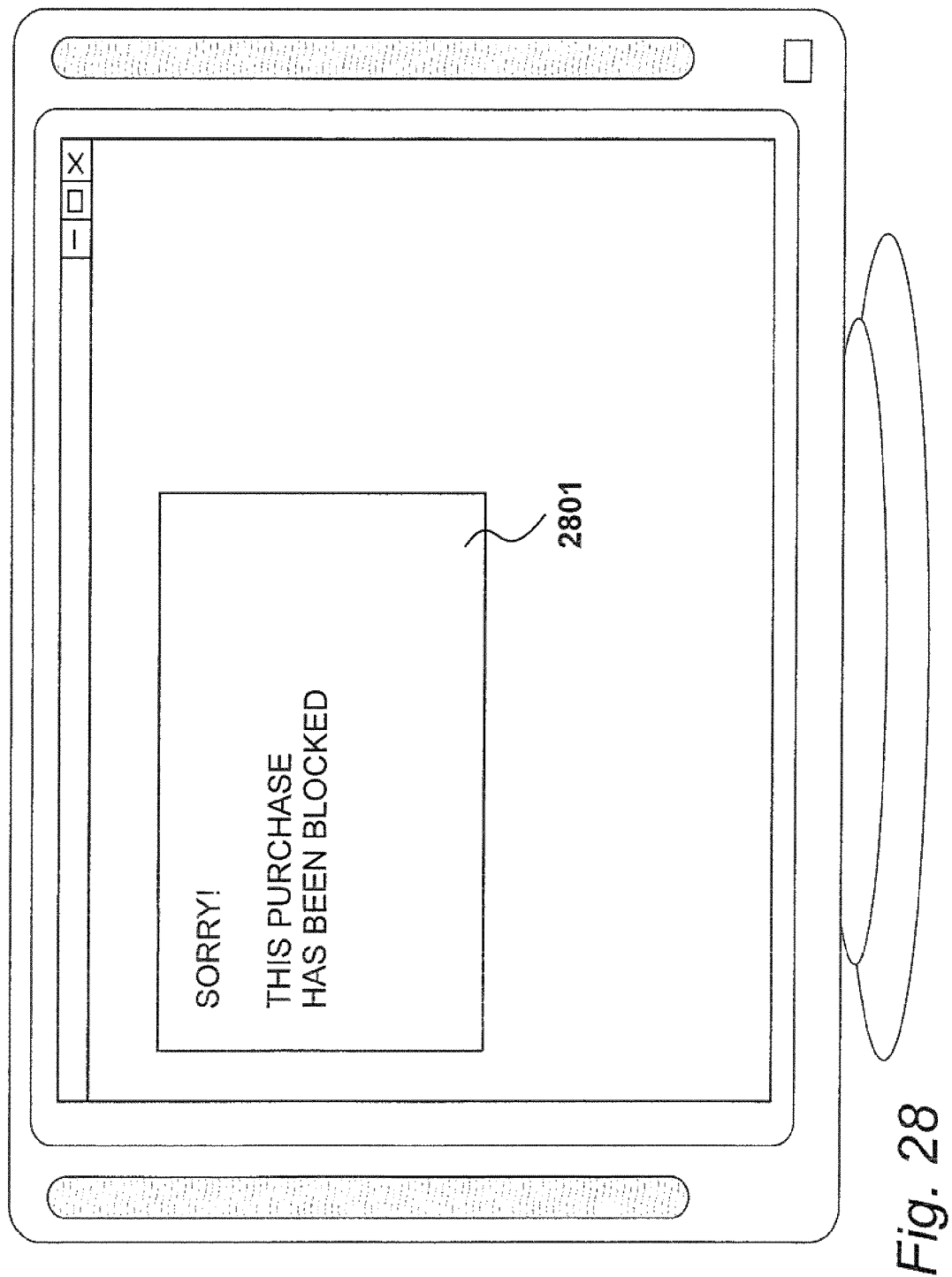
FIG. 28 illustrates a message displayed to a user when a transaction is blocked.

FIG. 28 illustrates a message displayed to a user when a transaction is blocked.

When the question asked in operation 2704 is answered in the negative, the sale continues, as illustrated in operation 2705, and the user is presented with an interface 605 allowing them to accept or cancel the sale via their mobile telephone account. However, if the question asked in operation 2704 is answered in the affirmative, to the effect that the sale has been blocked, a message 2801 will be displayed on monitor 401 to the effect that the sale has been blocked. Thus, a message states "sorry! This purchase has been blocked."

Figure 29:
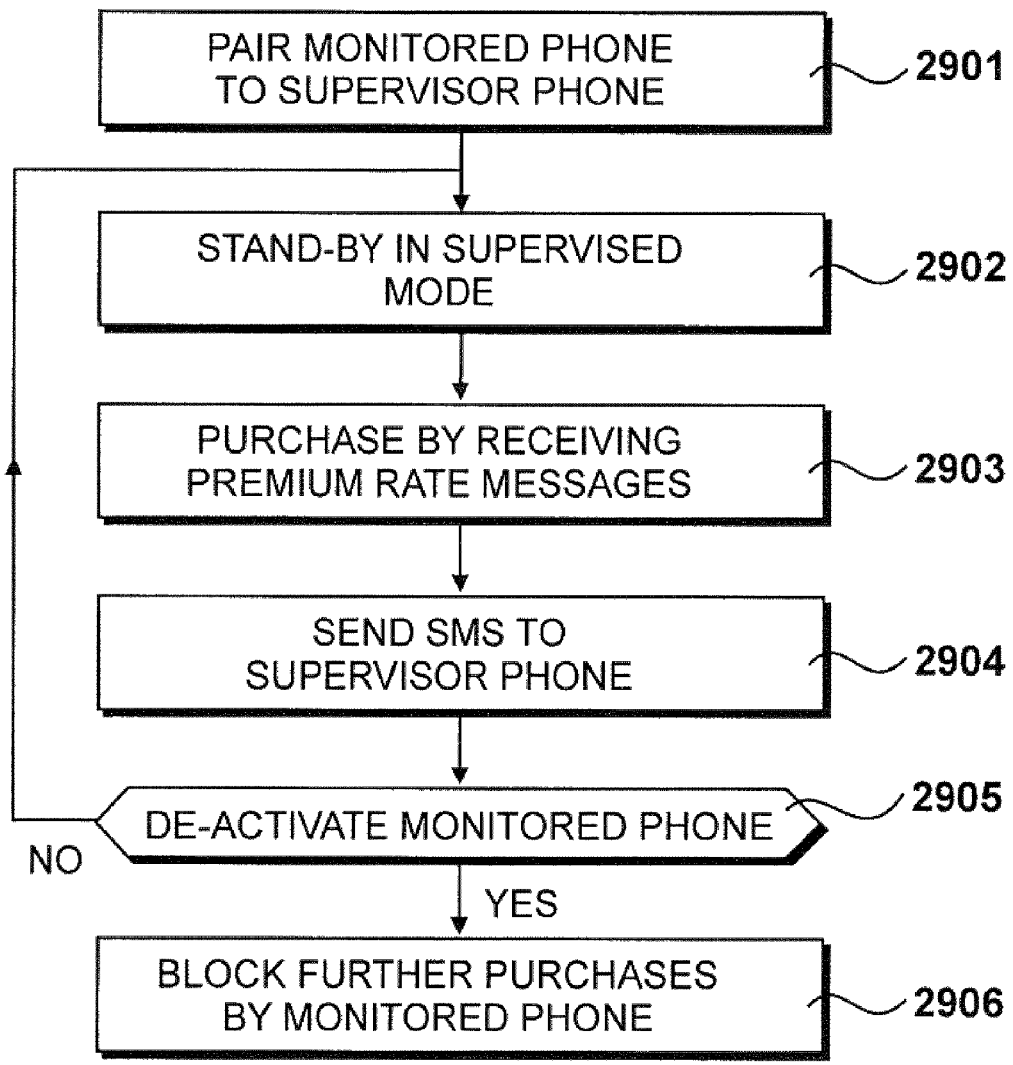
FIG. 29 illustrates a preferred embodiment.

An illustration of a preferred embodiment is illustrated in FIG. 29. In a preferred embodiment, the apparatus is configured for the reception of funds at a supplier electronically and has a customer browser component connected to a network, a supplier browser component connected to the network and a server component connected to the network and having a database component. In addition, a first mobile cellular telephone is operable by the customer and has a first telephone number. The server component is configured to transmit a plurality of premium rate mobile terminating text messages to the mobile cellular telephone to effect the transfer of funds for reception by the supplier, from the customer, after the customer has placed an order with the supplier. In addition, in accordance with the preferred embodiment, the server component is configured to transmit a notification message to a second mobile cellular telephone having a second telephone number confirming that the transfer of funds has taken place.

In the preferred embodiment, in order to create a situation where the notification message is sent, a mobile cellular telephone pairing exercise is performed in which a supervisor telephone is identified for receiving the notification message and a monitored telephone is specified. Consequently, the transmission of premium rate terminating messages to the monitored telephone results in the transmission of the notification message to the supervisor telephone.

In operation 2901 the server is notified to the effect that a monitored telephone is to be paired to a supervisor telephone. The pairing is performed such that the supervisor telephone will receive an SMS text message providing details of any transactions made by the monitored telephone.

In operation 2902 the supervisor telephone is effectively in a standby condition, available for transactions to take place.

In operation 2093 a purchase is made by the supervised telephone resulting in the transmission of premium rate messages.

In operation 2904 an SMS message is sent to the supervisor telephone identifying details of the transaction. In a first embodiment, no further action is taken and the monitored telephone effectively returns to stage 2902 and is considered to be in standby supervised mode. However, in the preferred embodiment, having received an SMS message at the supervisor telephone, following operation 2904, it is possible for the supervisor telephone to deactivate the monitored telephone. Thus, in operation 2905 a question is asked as to whether deactivation is to take place. When this question is answered in the negative, control is returned to operation 2902 and the monitored telephone returns to its standby supervised mode. However, if a question asked in operation 2905 is answered in the affirmative, further purchases by the monitored telephone are blocked in operation 2906.

Figure 30:
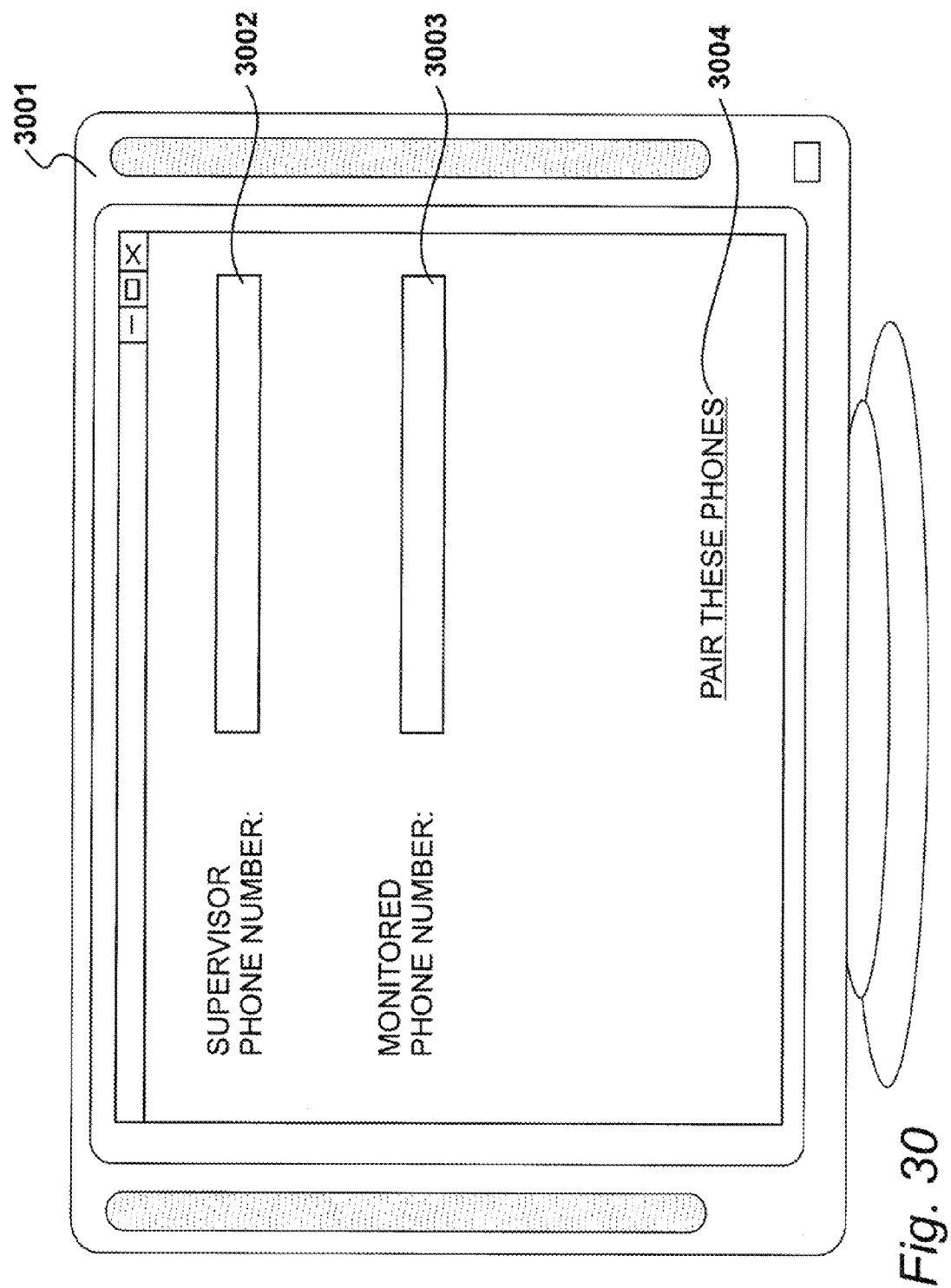
FIG. 30 illustrates procedures for pairing a monitored telephone to a supervisor telephone.

Procedures for pairing a monitored telephone to a supervisor telephone are illustrated in FIG. 30. A supervisor has access to a browser, that includes a monitor 3001 and a mouse and keyboard similar to the items 403 and 402 shown in FIG. 4.

Figure 32:
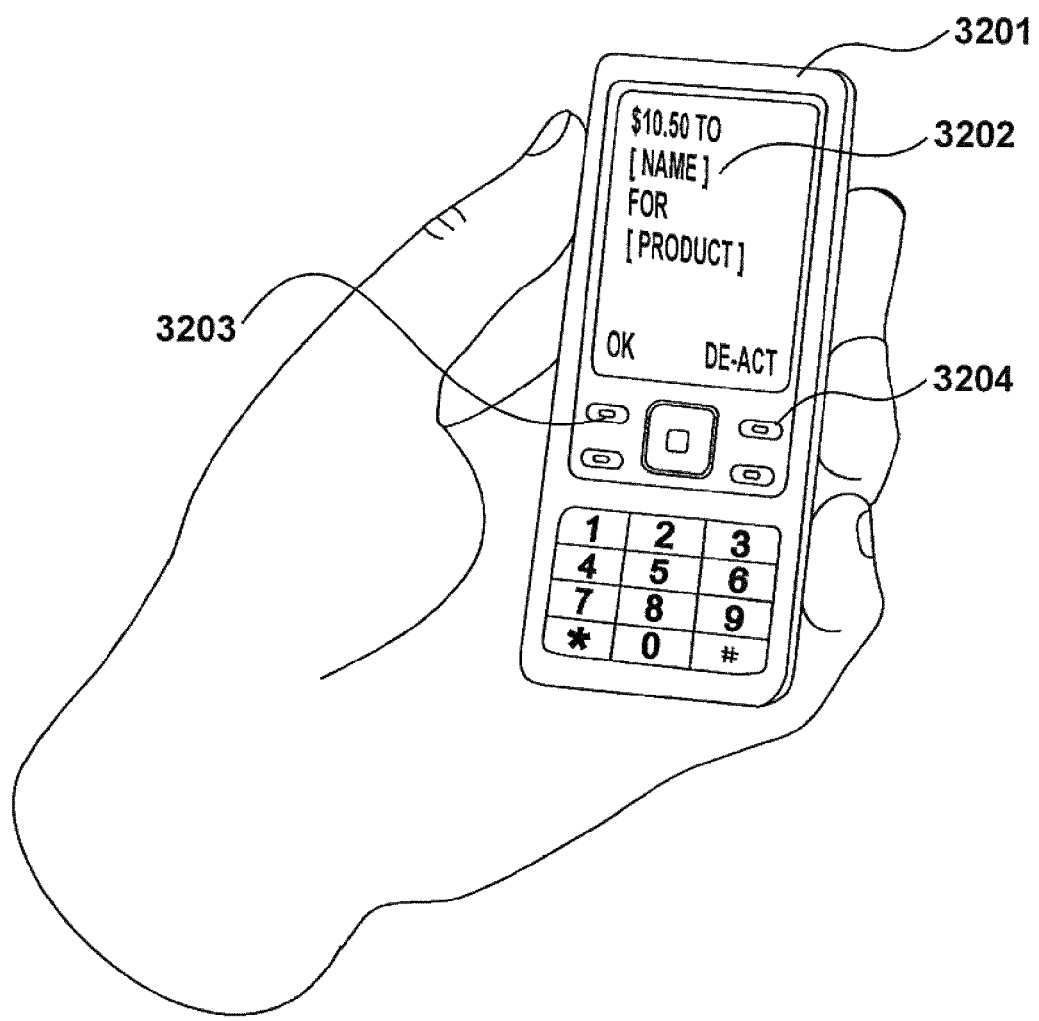
FIG. 32 illustrates a text message received on a supervisor's mobile cellular telephone to confirm that the monitored mobile cellular telephone has made a payment.

After accessing an appropriate website, a screen is presented on monitor 3001 as illustrated in FIG. 30. In this screen, it is possible for the supervisor to enter a supervisor telephone number in box 3002. Thereafter, a monitored telephone number is entered in box 3003. The supervisor then clicks on link 3004 so as to command the server 201 to pair the monitored telephone 202 (as shown in FIG. 13) to the supervisor telephone, as shown in FIG. 32.

After issuing a command to pair the monitored telephone to the supervisor telephone, the supervisor receives a second screen displayed at monitor 3001.

Figure 31:
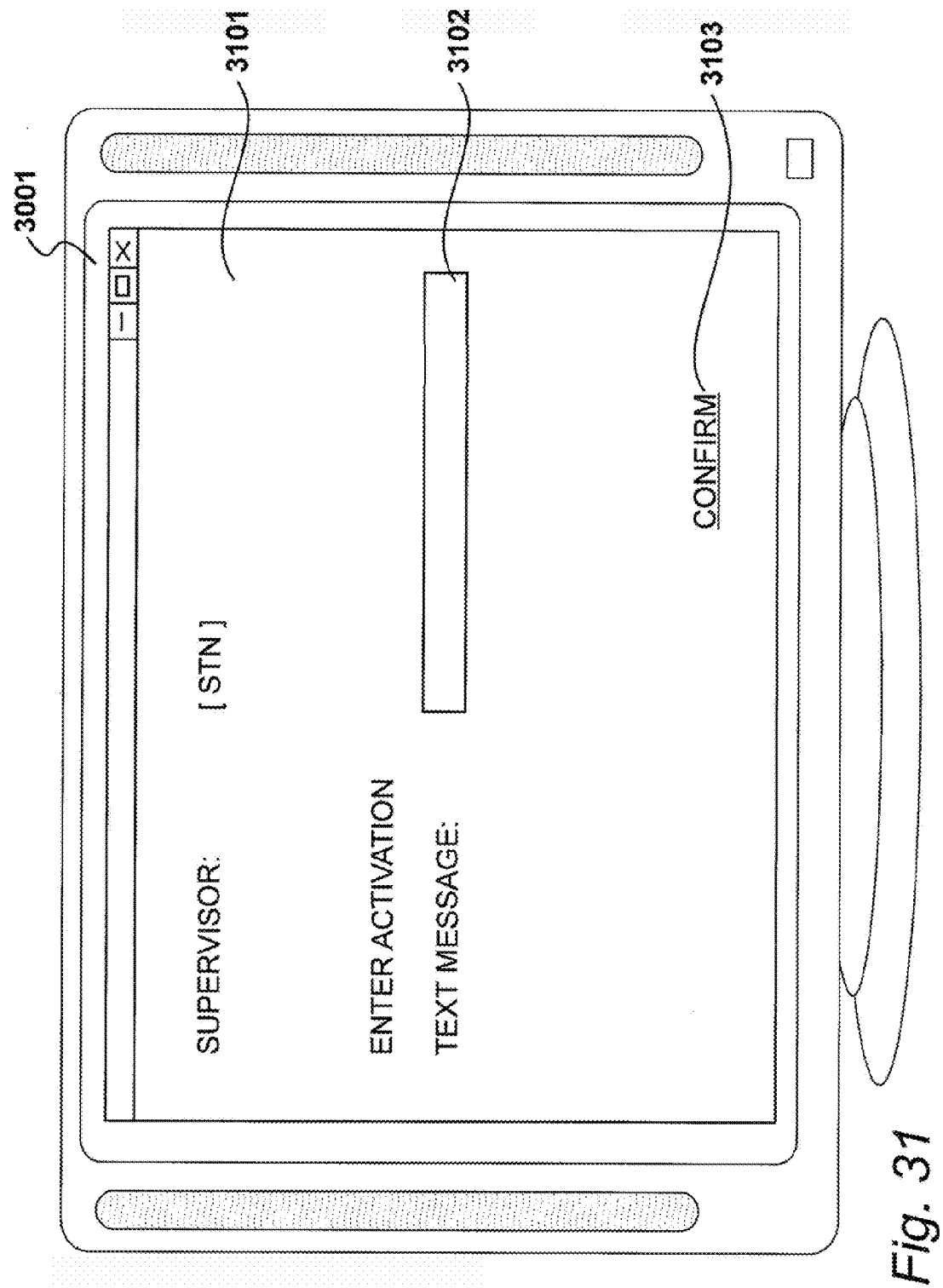
FIG. 31 illustrates a screen displayed after issuing a command to pair the monitored telephone to a supervisor telephone.

As shown in FIG. 31 this identifies the supervisor's telephone number at 3101. Furthermore, the server 201 is configured to issue an activation message to the supervisor mobile telephone as an SMS text message. Thus, in order to establish a telephone in a supervisor role, the supervisor must have access to the telephone so that the received message can be entered. Thus, on the assumption that the supervisor does have access to their mobile telephone and is in a position to read the text message, the message itself is entered in box 3102 after which the supervisor clicks on "confirm" link 3103.

After issuing the confirm command, the supervisor is presented with a second screen substantially similar to that shown in FIG. 31. However, on this occasion, the monitored telephone number is displayed and again a text message is sent to the monitored telephone. Thus, in order to pair the telephones, the supervisor must be in possession of the monitored telephone, whereupon the received text message is entered in the appropriate box (similar to box 3102) and again the confirm link is activated.

A supervisor's mobile cellular telephone 3201 is shown in FIG. 32. In the image shown, the supervisor's mobile cellular telephone 3201 has received a text message confirming that the monitored mobile cellular telephone 202 has made a payment by the process of receiving a plurality of premium rate mobile terminating messages. Thus, in this example, mobile telephone screen 3202 displays a message to the effect that 10.50 dollars has been paid to a specific supplier for a particular product.

In addition, a soft menu identifies key 3203 as being available for providing a response to the effect that the sale is considered to be alright and thereby requiring no further action. Furthermore, the soft menu identifies key 3204 as being available for generating a message back to the server to the effect that the monitored cellular telephone should be deactivated. Thus, in response to a deactivation message being created, further purchases by the monitored telephone are blocked.

In a preferred embodiment, it is possible for a timeout to occur so that it is not necessary for the supervisor to operate key 3203 or key 3204. Under these circumstances, after a period of five minutes, for example, the system would time out and it would be assumed that the transaction was considered to be alright. However, in an alternative embodiment it would be possible for the system to be assumed blocked until a positive deactivation code is provided.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus to electronically transfer funds from a customer to a supplier, the customer having a first mobile cellular telephone with a first telephone number, a mobile cellular operator providing mobile cellular services to the mobile cellular telephone, a customer browser component connected to a network, the apparatus comprising:
  a server component connected to the network; and
  a database coupled to the server component, wherein the server component is configured to:
    transmit a plurality of premium rate mobile terminating text messages to the first mobile cellular telephone to effect a transfer of funds from the customer for reception by the supplier, after the customer has placed an order with the supplier wherein the premium rate mobile terminating messages are scheduled to occur over a number of days to avoid a pre-established maximum daily limit.

2. The apparatus of claim 1, wherein the server component is configured to transmit a notification message to a second mobile cellular telephone having a second telephone number to confirm that the transfer of funds has taken place and pair the first mobile cellular telephone, as a monitored telephone, and the second mobile cellular telephone, as a supervisor telephone; and wherein the notification message to the second mobile cellular telephone as the supervisor telephone is in response to the premium rate mobile terminating text messages to the first mobile cellular telephone as a monitored telephone.

3. The apparatus of claim 2, wherein to pair the first mobile cellular telephone and the second mobile cellular telephone, the server component is configured to supply a supervisor confirmation text message to the second mobile cellular telephone, as the supervisor telephone, and to supply a monitored confirmation text message to first mobile cellular telephone, as the monitored telephone, wherein the server component is configured to receive responses to the supervisor confirmation text message and the monitored confirmation text message to complete pairing of the first mobile cellular telephone and the second mobile cellular telephone.

4. The apparatus of claim 1, wherein the server component is configured to transmit a notification message to a second mobile cellular telephone having a second telephone number to confirm that the transfer of funds has taken place.

5. The apparatus of claim 1, wherein the server component is configured to determine whether to allow or prohibit transmission of the text messages to effect a payment to the supplier, based upon an identification of stored classifications for the first telephone number.

6. The apparatus of claim 1, wherein the server is configured to facilitate access to transaction records for the first mobile cellular telephone via the first telephone number.

7. A method to provide funds from a customer to a supplier electronically, the method comprising:
   transmitting, from a server computer, a plurality of premium rate mobile terminating messages to a first mobile cellular telephone to effect a transfer of funds from the customer for reception by the supplier, after the customer has placed an order with the supplier wherein the premium rate mobile terminating messages are scheduled to occur over a number of days to avoid a pre-established maximum daily limit.

8. The method of claim 7, further comprising:
   transmitting, from the server computer, a notification message to a second mobile cellular telephone confirming that the transfer of funds has taken place; and
   pairing the first mobile cellular telephone, as a monitored telephone, with the second mobile cellular telephone, as a supervisor telephone; wherein the transmission of premium rate terminating messages to the monitored telephone results in the transmission of the notification message to the supervisor telephone.

9. The method of claim 8, further comprising pairing a plurality of monitored telephones with the supervisor telephone.

10. The method of claim 8, further comprising:
    supplying a supervisor confirmation text message to the supervisor telephone and supplying a monitored confirmation text message to the monitored telephone to pair the first mobile cellular telephone and the second mobile cellular telephone; and
    receiving responses to each of the supervisor confirmation text message and the monitored confirmation text message to complete the pairing.

11. The method of claim 8, further comprising deactivating any further sales made by premium rate mobile terminating messages to the monitored telephone, in response to a command from the supervisor telephone.

12. The method of claim 7, further comprising transmitting, from the server computer, a notification message to a second mobile cellular telephone confirming that the transfer of funds has taken place.

13. The method of claim 7, wherein a database coupled with the server is populated with an identification of telephone numbers of customers; and the method further comprises:
    prompting the customers to supply additional personal data; and
    storing the additional personal data in the database.

14. The method of claim 7, further comprising facilitating access to transaction records for the customer after receiving details related to the telephone number of the customer.

15. The method of claim 7, further comprising prohibiting transmission of text messages to effect payment based an identification of stored classifications.

16. A non-transitory computer-readable medium having computer-readable instructions, the instructions causing a computer to perform a method, the method comprising:
    transmitting a plurality of premium rate mobile terminating messages to a first mobile cellular telephone to effect a transfer of funds from the customer for reception by the supplier, after the customer has placed an order with the supplier wherein the premium rate mobile terminating messages are scheduled to occur over a number of days to avoid a pre-established maximum daily limit.

17. The non-transitory computer-readable medium of claim 16, wherein the method further comprises:
    transmitting, from the server computer, a notification message to a second mobile cellular telephone confirming that the transfer of funds has taken place; and
    pairing the first mobile cellular telephone, as a monitored telephone, with the second mobile cellular telephone, as a supervisor telephone; wherein the transmission of premium rate terminating messages to the monitored telephone results in the transmission of the notification message to the supervisor telephone.

18. The non-transitory computer-readable medium of claim 17, wherein the supervisor telephone is paired with a plurality of monitored telephones.

19. The non-transitory computer-readable medium of claim 17, wherein the method further comprises:
    supplying a supervisor confirmation text message to the supervisor telephone and supplying a monitored confirmation text message to the monitored telephone to pair the first mobile cellular telephone and the second mobile cellular telephone; and
    receiving responses to each of the supervisor confirmation text message and the monitored confirmation text message to complete the pairing.

20. The non-transitory computer-readable medium of claim 16, wherein the method further comprises transmitting, from the server computer, a notification message to a second mobile cellular telephone confirming that the transfer of funds has taken place.

* * * * *